(12) United States Patent
Beidaghi et al.

(10) Patent No.: US 11,905,426 B2
(45) Date of Patent: Feb. 20, 2024

(54) 3D PRINTING OF ADDITIVE-FREE MXENE INK FOR FABRICATION OF MICRO-SUPERCAPACITORS WITH ULTRA-HIGH ENERGY DENSITIES

(71) Applicant: AUBURN UNIVERSITY, Auburn, AL (US)

(72) Inventors: Majid Beidaghi, Auburn, AL (US); Jafar Orangi, Auburn, AL (US); Virginia A. Davis, Auburn, AL (US); Fatima A. Hamade, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 124 days.

(21) Appl. No.: 17/077,287

(22) Filed: Oct. 22, 2020

(65) Prior Publication Data

US 2021/0115284 A1  Apr. 22, 2021

Related U.S. Application Data

(60) Provisional application No. 62/924,281, filed on Oct. 22, 2019.

(51) Int. Cl.
| | |
|---|---|
| *C09D 11/52* | (2014.01) |
| *B29C 64/165* | (2017.01) |
| *C09D 11/033* | (2014.01) |
| *H01G 11/24* | (2013.01) |
| *H01G 11/28* | (2013.01) |
| *H01G 11/38* | (2013.01) |
| *H01G 11/86* | (2013.01) |

(Continued)

(52) U.S. Cl.
CPC ............ *C09D 11/52* (2013.01); *B29C 64/165* (2017.08); *C09D 11/033* (2013.01); *H01G 11/24* (2013.01); *H01G 11/28* (2013.01); *H01G 11/38* (2013.01); *H01G 11/86* (2013.01); *B33Y 70/10* (2020.01); *B33Y 80/00* (2014.12)

(58) Field of Classification Search
CPC ..................................................... C09D 11/52
See application file for complete search history.

(56) References Cited

U.S. PATENT DOCUMENTS

| | | |
|---|---|---|
| 2012/0170171 A1 | 7/2012 | Lee |
| 2015/0072162 A1 | 3/2015 | Hersam |

(Continued)

FOREIGN PATENT DOCUMENTS

| | | |
|---|---|---|
| CN | 108257791 A | 7/2018 |
| WO | 2014/072877 A2 | 5/2014 |

(Continued)

OTHER PUBLICATIONS

Partial International Search Report for PCT/ US2020/056749 dated Feb. 23, 2021.

*Primary Examiner* — William D Young
(74) *Attorney, Agent, or Firm* — Barnes & Thornburg LLP

(57) ABSTRACT

The disclosure provides ink compositions that comprise a 2D material and a solvent and the method to fabricate such compositions. The disclosure also provides the composition and method of fabricating 3D MSCs comprising such ink compositions. Additionally, the disclosure provides a conducting material comprising a battery composition, a 2D material, and a solvent that results in the formation of a composition that may be used for 3D printing of batteries.

7 Claims, 15 Drawing Sheets

(51) Int. Cl.
  *B33Y 80/00* (2015.01)
  *B33Y 70/10* (2020.01)

(56) References Cited

U.S. PATENT DOCUMENTS

| | | |
|---|---|---|
| 2017/0088429 A1 | 3/2017 | Shin |
| 2017/0294546 A1* | 10/2017 | Ghidiu ................ C04B 35/5618 |
| 2020/0102444 A1* | 4/2020 | Cho ...................... C09C 1/3692 |

FOREIGN PATENT DOCUMENTS

| | | |
|---|---|---|
| WO | 2016/049109 A2 | 3/2016 |
| WO | 2019/126031 A1 | 6/2019 |
| WO | 2020/144289 A1 | 7/2020 |

* cited by examiner

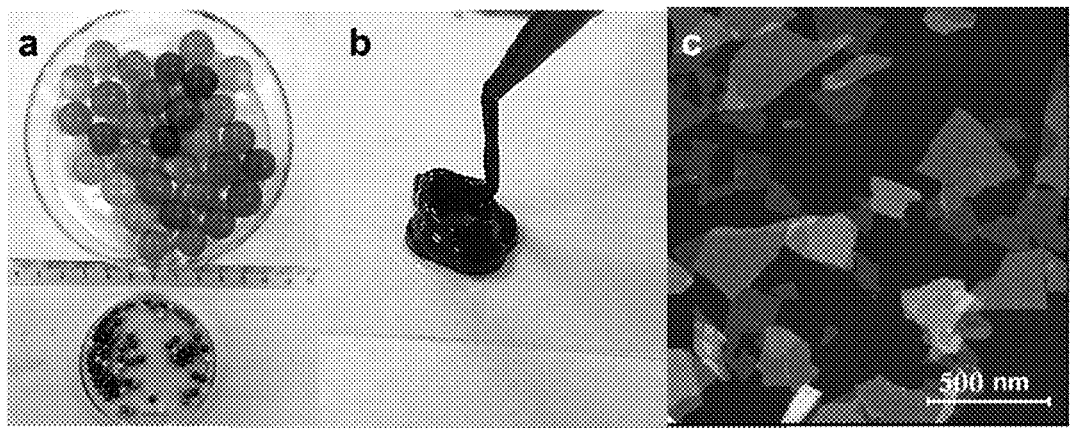
FIGURES 2A-C
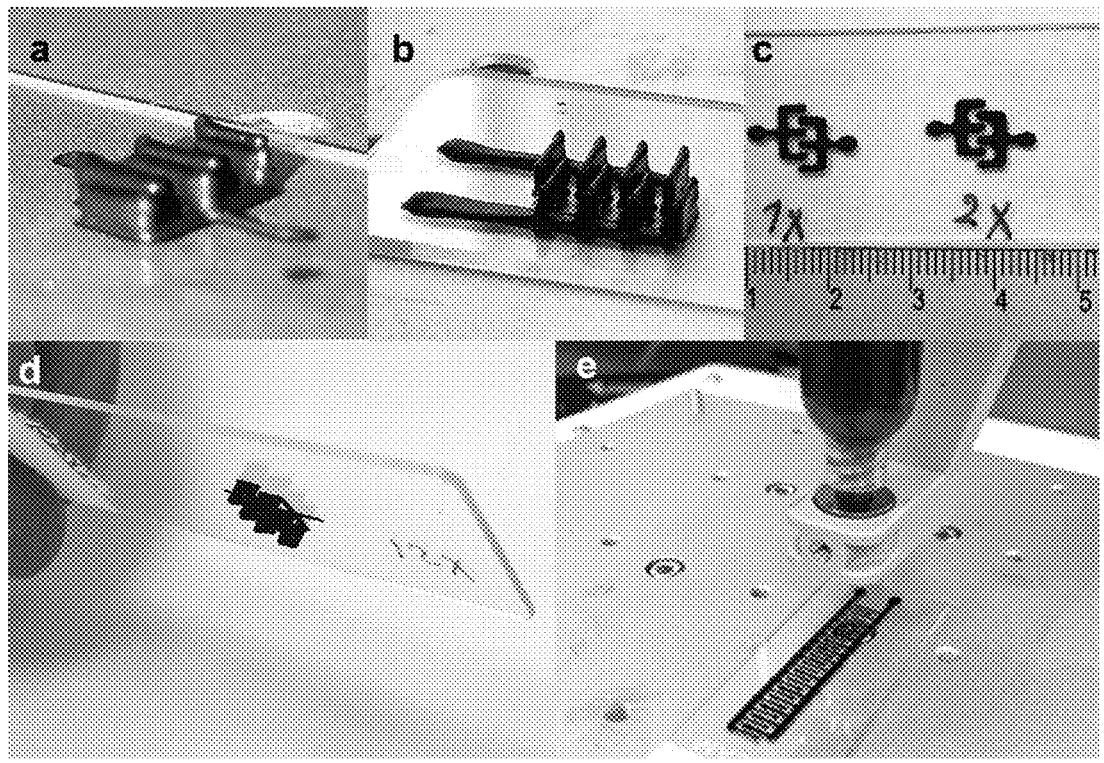
FIGURES 3A-3E

3D PRINTING OF ADDITIVE-FREE MXENE INK FOR FABRICATION OF MICRO-SUPERCAPACITORS WITH ULTRA-HIGH ENERGY DENSITIES

CROSS-REFERENCE TO RELATED APPLICATIONS

This application claims the benefit under 35 USC § 119(e) of U.S. Provisional Application Ser. No. 62/924,281, filed on Oct. 22, 2019, the entire disclosure of which is incorporated herein by reference.

TECHNICAL FIELD

The invention relates to ink compositions comprising a 2D material and a solvent, and micro-supercapacitors comprising such ink composition. The invention includes compositions, methods, and formulations for fabricating energy storage devices.

BACKGROUND AND SUMMARY OF THE INVENTION

Energy storage devices are expected to play an essential role in the future development of portable electronics, wireless sensors, and multifunctional micro/nanosystems. For efficient integration of storage devices with self-powered systems, direct fabrication of these devices on different substrates is greatly needed, for instance the fabrication of "on-chip" supercapacitors and batteries. On-chip supercapacitors, often referred to as micro-supercapacitors (MSCs), are high power devices with relatively high energy densities and can be suitable for integration with miniaturized electronics. Batteries such as Li-ion batteries (LIBs) have become an ever-increasing fraction of the total device volume. The fabrication of such devices in a 3D space instead of 2D planar space will enable packing more electrode materials in a limited area or volume of the device, addressing the need for both high power and high energy densities. Such storage devices need to be safe to use, inexpensive, and easy to manufacture for a variety of applications.

However, fabrication of 3D MSCs and batteries using extrusion-based 3D printing depends on the availability of printable inks that are based on highly conductive and electrochemically active electrode materials. To be printable, the ink should exhibit shear-thinning behavior and viscoelastic properties, which enable each layer to retain its shape while still providing enough fluidity for substrate and interlayer adhesion. However, most printable inks used in the ink writing of electrochemical devices and electrodes are prepared by using additives such as secondary solvents or surfactants to adjust their rheological properties. These additives may affect the electrical and electrochemically properties of the printed electrodes and may require removal after printing. Additionally, the electrode materials in commercial LIB s are mostly in the form of solid particles, which are not readily printable and require various types of additives to be converted to printable inks.

The storage properties of MSCs can be dependent on the intrinsic properties and the charge storage mechanism of their electrode materials and may be influenced by the configuration of different components of the device. Although three-dimensional (3D) architectures allow loading more active materials per unit area of the device to increase areal performance, scalable fabrication of 3D devices that utilize high-performance electrode materials still poses challenges.

Therefore, there exists a need for new compositions of printable inks and 3D MSCs, as well as methods for fabricating such compositions. Accordingly, the present disclosure provides ink compositions that comprise a 2D material and a solvent and the method to fabricate such compositions. The disclosure also provides the composition and method of fabricating 3D MSCs comprising such ink compositions. Additionally, the disclosure provides a conducting material comprising a battery composition, a 2D material, and a solvent that results in the formation of a composition that may be used for 3D printing of batteries.

The ink compositions, MSC compositions, and methods comprising the 2D material according to the present disclosure provide several advantages compared to other compositions, formulations, and methods known in the art. First, the 2D material in the ink composition may be highly concentrated without resulting in its agglomeration in the solvent. Such ultrahigh concentrated ink compositions may possess the viscoelastic, rheological, and electrochemical properties required for 3D printing without the requirement of additives. Such ink compositions also exhibit advantageous shear thinning behavior that can provide uniform flow when used for 3D printing.

Second, the MSCs comprising such ink composition benefit from the high electrical conductivity and excellent electrochemical properties of the 2D material used in the ink composition, as well as a 3D interdigital electrode architecture to deliver high areal and volumetric energy densities. Moreover, the performance of such MSCs may be enhanced in many ways. For instance, performance may be improved by engineering the electrode structures and ink properties to increase their out-of-plane conductivity. Since the rate performance of the fabricated devices is also dependent on their ion transport properties, it may be significantly improved by reducing the ionic diffusion path between the electrodes. Further, the rate capability and power density of such 3D MSCs may be improved by reducing the gap distance between the interdigital electrodes in modified device architectures regardless of the height of the electrodes.

Third, the fabrication of MSCs comprising such ink composition may take place at room temperature. A highly concentrated ink shows desirable viscoelastic properties for extrusion printing at room temperature, and therefore may be used for scalable fabrication of MSCs with various architectures and electrode thicknesses on a substrate. An important advantage of room temperature printing is that it allows for the fabrication of devices on a variety of substrates.

Fourth, the conducting material comprising a battery composition, a 2D material, and a solvent does not require the inclusion of conductive additives and/or polymeric binders that are used in conventional battery manufacturing methods and, therefore, show an improved energy storage performance compared to commercial batteries. Such materials are safe, environmentally friendly, inexpensive, and comprise simple chemical compositions.

Fifth, batteries fabricated comprising such conducting material exhibit enhanced electrochemical performances such as high areal capacity and faster charge-discharge ratios due to the improved ionic diffusion enabled by cell geometry and good electrical conductivity.

The following numbered embodiments are contemplated and are non-limiting:

1. An ink composition comprising:
   a 2D material, and
   a solvent.
2. The ink composition of clause 1, any other suitable clause, or any combination of suitable clauses, wherein the ink composition has a form selected from the group consisting of a colloidal particle, a colloidal dispersion, a colloidal suspension, a 2D nanomaterial, a nanomaterial dispersion, a nanomaterial suspension, and any combination thereof.
3. The ink composition of clause 2, any other suitable clause, or any combination of suitable clauses, wherein the ink composition is a colloidal dispersion.
4. The ink composition of clause 1, any other suitable clause, or any combination of suitable clauses, wherein the ink composition is substantially free of an additive.
5. The ink composition of clause 4, any other suitable clause, or any combination of suitable clauses, wherein the additive is a conducting material.
6. The ink composition of clause 4, any other suitable clause, or any combination of suitable clauses, wherein the additive is a polymer binder.
7. The ink composition of clause 1, any other suitable clause, or any combination of suitable clauses, wherein the ink composition is substantially free of a surfactant.
8. The ink composition of clause 7, any other suitable clause, or any combination of suitable clauses, wherein the surfactant is anionic.
9. The ink composition of clause 7, any other suitable clause, or any combination of suitable clauses, wherein the surfactant is cationic.
10. The ink composition of clause 7, any other suitable clause, or any combination of suitable clauses, wherein the surfactant is non-ionic.
11. The ink composition of clause 1, any other suitable clause, or any combination of suitable clauses, wherein the ink composition is substantially free of a secondary solvent.
12. The ink composition of clause 11, any other suitable clause, or any combination of suitable clauses, wherein the secondary solvent is an organic solvent.
13. The ink composition of clause 11, any other suitable clause, or any combination of suitable clauses, wherein the secondary solvent is an inorganic solvent.
14. The ink composition of clause 1, any other suitable clause, or any combination of suitable clauses, wherein the 2D material is a 2D nanomaterial.
15. The ink composition of clause 1, any other suitable clause, or any combination of suitable clauses, wherein the 2D material is electrically conductive.
16. The ink composition of clause 1, any other suitable clause, or any combination of suitable clauses, wherein the 2D material is a MXene composition.
17. The ink composition of clause 16, any other suitable clause, or any combination of suitable clauses, wherein the MXene composition is a transition metal carbide.
18. The ink composition of clause 16, any other suitable clause, or any combination of suitable clauses, wherein the MXene composition is a transition metal nitride.
19. The ink composition of clause 16, any other suitable clause, or any combination of suitable clauses, wherein the MXene composition is of a general formula $M_{n+1}X_nT_x$ (n=1, 2, or 3), where M denotes a transition metal, X is carbon and/or nitrogen, and $T_x$ denotes a surface functional group.
20. The ink composition of clause 19, any other suitable clause, or any combination of suitable clauses, wherein M is selected from a group consisting of Ti, Cr, V, Mo, Zr, Sc, Mn, Nb, Y, W, Ta, and Hf.
21. The ink composition of clause 19, any other suitable clause, or any combination of suitable clauses, wherein $T_x$ is selected from a group consisting of =O, =OH, and =F.
22. The ink composition of clause 19, any other suitable clause, or any combination of suitable clauses, wherein $T_x$ is selected from a group consisting of =O, =OH, =Cl, =N, and =F.
23. The ink composition of clause 16, any other suitable clause, or any combination of suitable clauses, wherein the MXene composition is $Ti_3C_2T_x$ and wherein $T_x$ denotes a surface functional group.
24. The ink composition of clause 23, any other suitable clause, or any combination of suitable clauses, wherein $T_x$ is selected from a group consisting of =O, =OH, and =F.
25. The ink composition of clause 23, any other suitable clause, or any combination of suitable clauses, wherein $T_x$ is selected from a group consisting of =O, =OH, =Cl, =N, and =F.
26. The ink composition of clause 1, any other suitable clause, or any combination of suitable clauses, wherein the 2D material comprises a specific capacitance between about 20 F cm$^{-3}$ to about 2000 F cm$^{-3}$.
27. The ink composition of clause 1, any other suitable clause, or any combination of suitable clauses, wherein the solvent is water.
28. The ink composition of clause 27, any other suitable clause, or any combination of suitable clauses, wherein the ink composition comprises about 15% to about 85% water (wt %).
29. The ink composition of clause 27, any other suitable clause, or any combination of suitable clauses, wherein the ink composition comprises about 25% to about 75% water (wt %).
30. The ink composition of clause 27, any other suitable clause, or any combination of suitable clauses, wherein the ink composition comprises about 35% to about 75% water (wt %).
31. The ink composition of clause 27, any other suitable clause, or any combination of suitable clauses, wherein the ink composition comprises about 50% to about 75% water (wt %).
32. The ink composition of clause 27, any other suitable clause, or any combination of suitable clauses, wherein the ink composition comprises about 65% to about 75% water (wt %).
33. The ink composition of clause 1, any other suitable clause, or any combination of suitable clauses, wherein the 2D material is dispersed in the solvent.
34. The ink composition of clause 33, any other suitable clause, or any combination of suitable clauses, wherein the 2D material comprises flakes dispersed in the solvent.
35. The ink composition of clause 34, any other suitable clause, or any combination of suitable clauses, wherein the flakes are delaminated.
36. The ink composition of clause 34, any other suitable clause, or any combination of suitable clauses, wherein the flakes are arranged in a single layer in the solvent.
37. The ink composition of clause 34, any other suitable clause, or any combination of suitable clauses, wherein the concentration of the flakes in the solvent is between about 50 mg/ml to about 750 mg/ml.

38. The ink composition of clause 34, any other suitable clause, or any combination of suitable clauses, wherein the concentration of the flakes in the solvent is between about 50 mg/ml to about 500 mg/ml.

39. The ink composition of clause 34, any other suitable clause, or any combination of suitable clauses, wherein the concentration of the flakes in the solvent is between about 100 mg/ml to about 400 mg/ml.

40. The ink composition of clause 34, any other suitable clause, or any combination of suitable clauses, wherein the concentration of the flakes in the solvent is between about 250 mg/ml to about 350 mg/ml.

41. The ink composition of clause 34, any other suitable clause, or any combination of suitable clauses, wherein the size of the flakes in the solvent is between about 0.25 µm to about 250 µm.

42. The ink composition of clause 34, any other suitable clause, or any combination of suitable clauses, wherein the size of the flakes in the solvent is between about 0.25 µm to about 0.35 µm.

43. The ink composition of clause 34, any other suitable clause, or any combination of suitable clauses, wherein the size of the flakes in the solvent is between about 0.25 µm to about 1 µm.

44. The ink composition of clause 34, any other suitable clause, or any combination of suitable clauses, wherein the size of the flakes in the solvent is between about 0.25 µm to about 200 µm.

45. The ink composition of clause 34, any other suitable clause, or any combination of suitable clauses, wherein the size of the flakes in the solvent is between about 5 µm to about 100 µm.

46. The ink composition of clause 34, any other suitable clause, or any combination of suitable clauses, wherein the size of the flakes in the solvent is between about 5 µm to about 50 µm.

47. The ink composition of clause 1, any other suitable clause, or any combination of suitable clauses, wherein the ink composition is viscoelastic.

48. The ink composition of clause 1, any other suitable clause, or any combination of suitable clauses, wherein the ink composition has an elastic modulus and a viscous modulus, and wherein the elastic modulus is greater than the viscous modulus when measured at a frequency from about 0.01 Hz to about 10 Hz.

49. The ink composition of clause 1, any other suitable clause, or any combination of suitable clauses, wherein the ink composition has a yield stress.

50. The ink composition of clause 49, any other suitable clause, or any combination of suitable clauses, wherein the yield stress can be overcome in an extruder nozzle.

51. The ink composition of clause 49, any other suitable clause, or any combination of suitable clauses, wherein the ink composition exhibits a shear thinning behavior above the yield stress.

52. The ink composition of clause 1, any other suitable clause, or any combination of suitable clauses, wherein the ink composition is adapted for three dimensional (3D) printing.

53. The ink composition of clause 52, any other suitable clause, or any combination of suitable clauses, wherein the ink composition is adapted for 3D printing of a micro-supercapacitor.

54. The ink composition of clause 52, any other suitable clause, or any combination of suitable clauses, wherein the ink composition is adapted for 3D printing for an operation selected from the group consisting of an energy storage application, an electronic device, an electromagnetic shielding sensor, an antenna, a biomedical application and any combination thereof.

55. A micro-supercapacitor (MSC) composition comprising one or more layers of an ink composition contacted on a substrate.

56. The MSC composition of clause 55, any other suitable clause, or any combination of suitable clauses, wherein the ink composition has a form selected from the group consisting of a colloidal particle, a colloidal dispersion, a colloidal suspension, a 2D nanomaterial, a nanomaterial dispersion, a nanomaterial suspension, and any combination thereof.

57. The MSC composition of clause 56, any other suitable clause, or any combination of suitable clauses, wherein the ink composition is a colloidal dispersion.

58. The MSC composition of clause 55, any other suitable clause, or any combination of suitable clauses, wherein the ink composition is substantially free of an additive.

59. The MSC composition of clause 58, any other suitable clause, or any combination of suitable clauses, wherein the additive is a conducting material.

60. The MSC composition of clause 58, any other suitable clause, or any combination of suitable clauses, wherein the additive is a polymer binder.

61. The MSC composition of clause 55, any other suitable clause, or any combination of suitable clauses, wherein the ink composition is substantially free of a surfactant.

62. The MSC composition of clause 61, any other suitable clause, or any combination of suitable clauses, wherein the surfactant is wherein the surfactant is anionic.

63. The MSC composition of clause 61, any other suitable clause, or any combination of suitable clauses, wherein the surfactant is cationic.

64. The MSC composition of clause 61, any other suitable clause, or any combination of suitable clauses, wherein the surfactant is non-ionic.

65. The MSC composition of clause 55, any other suitable clause, or any combination of suitable clauses, wherein the ink composition is substantially free of a secondary solvent.

66. The MSC composition of clause 65, any other suitable clause, or any combination of suitable clauses, wherein the secondary solvent is an organic solvent.

67. The MSC composition of clause 65, any other suitable clause, or any combination of suitable clauses, wherein the secondary solvent is an inorganic solvent.

68. The MSC composition of clause 55, any other suitable clause, or any combination of suitable clauses, wherein the ink composition comprises a 2D material and a solvent.

69. The MSC composition of clause 68, any other suitable clause, or any combination of suitable clauses, wherein the 2D material is a 2D nanomaterial.

70. The MSC composition of clause 68, any other suitable clause, or any combination of suitable clauses, wherein the 2D material is electrically conductive.

71. The MSC composition of clause 68, any other suitable clause, or any combination of suitable clauses, wherein the 2D material is a MXene composition.

72. The MSC composition of clause 71, any other suitable clause, or any combination of suitable clauses, wherein the MXene composition is a transition metal carbide.

73. The MSC composition of clause 71, any other suitable clause, or any combination of suitable clauses, wherein the MXene composition is a transition metal nitride.

74. The MSC composition of clause 71, any other suitable clause, or any combination of suitable clauses, wherein the MXene composition has a general formula of $M_{n+1}X_nT_x$ (n–1, 2, or 3), where M denotes a transition metal, X is carbon and/or nitrogen, and $T_x$ denotes a surface functional group.

75. The MSC composition of clause 74, any other suitable clause, or any combination of suitable clauses, wherein M is selected from a group consisting of Ti, Cr, V, Mo, Zr, Sc, Mn, Nb, Y, W, Ta, and Hf.

76. The MSC composition of clause 74, any other suitable clause, or any combination of suitable clauses, wherein $T_x$ is selected from a group consisting of =O, =OH, and =F.

77. The MSC composition of clause 74, any other suitable clause, or any combination of suitable clauses, wherein $T_x$ is selected from a group consisting of =O, =OH, =Cl, =N, and =F.

78. The MSC composition of clause 71, any other suitable clause, or any combination of suitable clauses, wherein the MXene composition is $Ti_3C_2T_x$, and wherein $T_x$ denotes a surface functional group.

79. The MSC composition of clause 78, any other suitable clause, or any combination of suitable clauses, wherein $T_x$ is selected from a group consisting of =O, =OH, and =F.

80. The MSC composition of clause 78, any other suitable clause, or any combination of suitable clauses, wherein $T_x$ is selected from a group consisting of =O, =OH, =Cl, =N, and =F.

81. The MSC composition of clause 80, any other suitable clause, or any combination of suitable clauses, wherein the 2D material is dispersed in the solvent.

82. The MSC composition of clause 81, any other suitable clause, or any combination of suitable clauses, wherein the 2D material comprises flakes dispersed in the solvent.

83. The MSC composition of clause 82, any other suitable clause, or any combination of suitable clauses, wherein the flakes are delaminated.

84. The MSC composition of clause 82, any other suitable clause, or any combination of suitable clauses, wherein the flakes are arranged in a single layer in the solvent.

85. The MSC composition of clause 82, any other suitable clause, or any combination of suitable clauses, wherein the concentration of the flakes in the solvent is between about 50 mg/ml to about 750 mg/ml.

86. The MSC composition of clause 82, any other suitable clause, or any combination of suitable clauses, wherein the concentration of the flakes in the solvent is between about 50 mg/ml to about 500 mg/ml.

87. The MSC composition of clause 82, any other suitable clause, or any combination of suitable clauses, wherein the concentration of the flakes in the solvent is between about 100 mg/ml to about 400 mg/ml.

88. The MSC composition of clause 82, any other suitable clause, or any combination of suitable clauses, wherein the concentration of the flakes in the solvent is between about 250 mg/ml to about 350 mg/ml.

89. The MSC composition of clause 82, any other suitable clause, or any combination of suitable clauses, wherein the size of the flakes in the solvent is between about 0.25 μm to about 250 μm.

90. The MSC composition of clause 82, any other suitable clause, or any combination of suitable clauses, wherein the size of the flakes in the solvent is between about 0.25 μm to about 0.35 μm.

91. The MSC composition of clause 82, any other suitable clause, or any combination of suitable clauses, wherein the size of the flakes in the solvent is between about 0.25 μm to about 1 μm.

92. The MSC composition of clause 82, any other suitable clause, or any combination of suitable clauses, wherein the size of the flakes in the solvent is between about 0.25 μm to about 200 μm.

93. The MSC composition of clause 82, any other suitable clause, or any combination of suitable clauses, wherein the size of the flakes in the solvent is between about 5 μm to about 100 μm.

94. The MSC composition of clause 82, any other suitable clause, or any combination of suitable clauses, wherein the size of the flakes in the solvent is between about 5 μm to about 50 μm.

95. The MSC composition of clause 82, any other suitable clause, or any combination of suitable clauses, wherein the flakes are horizontally aligned when contacted on the substrate.

96. The MSC composition of clause 80, any other suitable clause, or any combination of suitable clauses, wherein the solvent is water.

97. The MSC composition of clause 96, any other suitable clause, or any combination of suitable clauses, wherein the ink composition comprises about 15% to about 85% water (wt %).

98. The MSC composition of clause 96, any other suitable clause, or any combination of suitable clauses, wherein the ink composition comprises about 25% to about 75% water (wt %).

99. The MSC composition of clause 96, any other suitable clause, or any combination of suitable clauses, wherein the ink composition comprises about 35% to about 75% water (wt %).

100. The MSC composition of clause 96, any other suitable clause, or any combination of suitable clauses, wherein the ink composition comprises about 50% to about 75% water (wt %).

101. The MSC composition of clause 96, any other suitable clause, or any combination of suitable clauses, wherein the ink composition comprises about 65% to about 75% water (wt %).

102. The MSC composition of clause 55, any other suitable clause, or any combination of suitable clauses, wherein the ink composition contacted on the substrate is printed on the substrate.

103. The MSC composition of clause 102, any other suitable clause, or any combination of suitable clauses, wherein the ink composition contacted on the substrate does not collapse after being printed on the substrate.

104. The MSC composition of clause 102, any other suitable clause, or any combination of suitable clauses, wherein the ink composition contacted on the substrate is printed on the substrate via direct ink writing (DIW).

105. The MSC composition of clause 102, any other suitable clause, or any combination of suitable clauses, wherein the ink composition contacted on the substrate is printed on the substrate via extrusion-based additive manufacturing.

106. The MSC composition of clause 102, any other suitable clause, or any combination of suitable clauses, wherein the ink composition contacted on the substrate is printed on the substrate through a nozzle.

107. The MSC composition of clause 102, any other suitable clause, or any combination of suitable clauses, wherein the ink composition contacted on the substrate is printed on the substrate through a syringe comprising an attached tip.

108. The MSC composition of clause 107, any other suitable clause, or any combination of suitable clauses, wherein the inner diameter of the attached tip is between about 20 μm to about 2 mm.

109. The MSC composition of clause 102, any other suitable clause, or any combination of suitable clauses, wherein the ink composition contacted on the substrate is two or more layers, and wherein the ink composition is printed on the substrate in a layer-by-layer manner.

110. The MSC composition of clause 55, any other suitable clause, or any combination of suitable clauses, wherein the ink composition contacted on the substrate provides a 3D structure.

111. The MSC composition of clause 55, any other suitable clause, or any combination of suitable clauses, wherein the ink composition is viscoelastic.

112. The MSC composition of clause 55, any other suitable clause, or any combination of suitable clauses, wherein the ink composition has an elastic modulus and a viscous modulus, and wherein the elastic modulus is greater than the viscous modulus when measured at a frequency from about 0.01 Hz to about 10 Hz.

113. The MSC composition of clause 55, any other suitable clause, or any combination of suitable clauses, wherein the ink composition has a yield stress.

114. The MSC composition of clause 113, any other suitable clause, or any combination of suitable clauses, wherein the yield stress can be overcome in an extruder nozzle.

115. The MSC composition of clause 113, any other suitable clause, or any combination of suitable clauses, wherein the ink composition exhibits a shear thinning behavior above the yield stress.

116. The MSC composition of clause 55, any other suitable clause, or any combination of suitable clauses, wherein the one or more layers of the ink composition contacted on the substrate each possess a height from about 1 μm to about 100 μm.

117. The MSC composition of clause 55, any other suitable clause, or any combination of suitable clauses, wherein the one or more layers of the ink composition contacted on the substrate comprise an electrode.

118. The MSC composition of clause 117, any other suitable clause, or any combination of suitable clauses, wherein the electrode possesses a height from about 1 μm to about 100 μm.

119. The MSC composition of clause 55, any other suitable clause, or any combination of suitable clauses, wherein the one or more layers of the ink composition contacted on the substrate comprise a first electrode and optionally comprise a second electrode.

120. The MSC composition of clause 119, any other suitable clause, or any combination of suitable clauses, wherein the first and second electrodes are contacted on the substrate in an interdigital configuration.

121. The MSC composition of clause 55, any other suitable clause, or any combination of suitable clauses, wherein the one or more layers of the ink composition contacted on the substrate comprise a current collector.

122. The MSC composition of clause 55, any other suitable clause, or any combination of suitable clauses, wherein the substrate is selected from a group consisting of glass, paper, a textile, a polymer film, a polymer coating, an inorganic film, an inorganic coating, a Si wafer, a $SiO_2$ wafer, and any combination thereof.

123. The MSC composition of clause 55, any other suitable clause, or any combination of suitable clauses, wherein the substrate is a textile and wherein the textile is cloth.

124. The MSC composition of clause 55, any other suitable clause, or any combination of suitable clauses, wherein the substrate is a textile and wherein the textile is fabric.

125. The MSC composition of clause 55, any other suitable clause, or any combination of suitable clauses, wherein the substrate is a film made from a colloidal dispersion.

126. The MSC composition of clause 55, any other suitable clause, or any combination of suitable clauses, wherein the substrate is a film made from a nanomaterial dispersion.

127. The MSC composition of clause 55, any other suitable clause, or any combination of suitable clauses, wherein the substrate is a wearable composition.

128. The MSC composition of clause 55, any other suitable clause, or any combination of suitable clauses, wherein in the substrate is a rigid substance.

129. The MSC composition of clause 55, any other suitable clause, or any combination of suitable clauses, wherein in the substrate is a flexible substance.

130. The MSC composition of clause 55, any other suitable clause, or any combination of suitable clauses, wherein the micro-supercapacitor composition comprises 2 layers of the ink composition contacted on the substrate.

131. The MSC composition of clause 55, any other suitable clause, or any combination of suitable clauses, wherein the micro-supercapacitor composition comprises 5 layers of the ink composition contacted on the substrate.

132. The MSC composition of clause 55, any other suitable clause, or any combination of suitable clauses, wherein the micro-supercapacitor composition comprises 10 layers of the ink composition contacted on the substrate.

133. The MSC composition of clause 55, any other suitable clause, or any combination of suitable clauses, wherein the micro-supercapacitor is fabricated at room temperature.

134. The MSC composition of clause 55, any other suitable clause, or any combination of suitable clauses, wherein the micro-supercapacitor composition has a volumetric capacitance between about 1 F $cm^{-3}$ to about 2000 F $cm^{-3}$.

135. The MSC composition of clause 55, any other suitable clause, or any combination of suitable clauses, wherein the micro-supercapacitor composition has a volumetric capacitance between about 100 F $cm^{-3}$ to about 1000 F $cm^{-3}$.

136. The MSC composition of clause 55, any other suitable clause, or any combination of suitable clauses, wherein the micro-supercapacitor composition has a volumetric capacitance between about 200 F $cm^{-3}$ to about 800 F $cm^{-3}$.

137. The MSC composition of clause 55, any other suitable clause, or any combination of suitable clauses, wherein the micro-supercapacitor composition has a volumetric capacitance between about 300 F $cm^{-3}$ to about 500 F $cm^{-3}$.

138. The MSC composition of clause 55, any other suitable clause, or any combination of suitable clauses, wherein the micro-supercapacitor composition has an areal capacitance between about 0.1 F $cm^{-2}$ to about 25 F $cm^{-2}$.

139. The MSC composition of clause 55, any other suitable clause, or any combination of suitable clauses, wherein the micro-supercapacitor composition has an areal capacitance between about 1 F $cm^{-2}$ to about 25 F $cm^{-2}$.

140. The MSC composition of clause 55, any other suitable clause, or any combination of suitable clauses, wherein the micro-supercapacitor composition has an areal capacitance between about 1 F $cm^{-2}$ to about 20 F $cm^{-2}$.

141. The MSC composition of clause 55, any other suitable clause, or any combination of suitable clauses, wherein the micro-supercapacitor composition has an areal capacitance between about 5 F $cm^{-2}$ to about 15 F $cm^{-2}$.

142. The MSC composition of clause 55, any other suitable clause, or any combination of suitable clauses, wherein the micro-supercapacitor composition has an energy density between about 1 μWh $cm^{-2}$ to about 1000 μWh $cm^{-2}$.

143. The MSC composition of clause 55, any other suitable clause, or any combination of suitable clauses, wherein the micro-supercapacitor composition has an energy density between about 10 $\mu Wh\ cm^{-2}$ to about 500 $\mu Wh\ cm^{-2}$.

144. The MSC composition of clause 55, any other suitable clause, or any combination of suitable clauses, wherein the micro-supercapacitor composition has an energy density between about 50 $\mu Wh\ cm^{-2}$ to about 500 $\mu Wh\ cm^{-2}$.

145. The MSC composition of clause 55, any other suitable clause, or any combination of suitable clauses, wherein the micro-supercapacitor composition has an energy density between about 100 $\mu Wh\ cm^{-2}$ to about 500 $\mu Wh\ cm^{-2}$.

146. The MSC composition of clause 55, any other suitable clause, or any combination of suitable clauses, wherein the micro-supercapacitor composition is a first micro-supercapacitor composition and wherein the first micro-supercapacitor composition can optionally be connected to a second micro-supercapacitor composition.

147. The MSC composition of clause 146, any other suitable clause, or any combination of suitable clauses, wherein the first micro-supercapacitor composition is connected to the second micro-supercapacitor composition in series.

148. The MSC composition of clause 146, any other suitable clause, or any combination of suitable clauses, wherein the first micro-supercapacitor composition is connected to the second micro-supercapacitor composition in parallel.

149. A method for manufacturing an ink composition, said method comprising the steps of:
dispersing a 2D material in a solvent to form a dispersion, and
concentrating the dispersion.

150. The method of clause 149, any other suitable clause, or any combination of suitable clauses, wherein the step of dispersing the 2D material comprises combining the 2D material and the solvent to form the dispersion.

151. The method of clause 150, any other suitable clause, or any combination of suitable clauses, wherein the step of dispersing the 2D material further comprises sonicating the dispersion.

152. The method of clause 151, any other suitable clause, or any combination of suitable clauses, wherein sonicating the dispersion comprises tip sonication.

153. The method of clause 152, any other suitable clause, or any combination of suitable clauses, wherein the tip sonication is done for about 5 minutes to about 120 minutes.

154. The method of clause 152, any other suitable clause, or any combination of suitable clauses, wherein the tip sonication is done for about 15 minutes to about 100 minutes.

155. The method of clause 152, any other suitable clause, or any combination of suitable clauses, wherein the tip sonication is done for about 25 minutes to about 35 minutes.

156. The method of clause 151, any other suitable clause, or any combination of suitable clauses, wherein sonicating the dispersion comprises forming flakes dispersed in the solvent.

157. The method of clause 156, any other suitable clause, or any combination of suitable clauses, wherein the flakes are delaminated.

158. The method of clause 156, any other suitable clause, or any combination of suitable clauses, wherein the flakes are arranged in a single layer in the solvent.

159. The method of clause 156, any other suitable clause, or any combination of suitable clauses, wherein the concentration of the flakes in the solvent is between about 50 mg/ml to about 750 mg/ml.

160. The method of clause 156, any other suitable clause, or any combination of suitable clauses, wherein the concentration of the flakes in the solvent is between about 50 mg/ml to about 500 mg/ml.

161. The method of clause 156, any other suitable clause, or any combination of suitable clauses, wherein the concentration of the flakes in the solvent is between about 100 mg/ml to about 400 mg/ml.

162. The method of clause 156, any other suitable clause, or any combination of suitable clauses, wherein the concentration of the flakes in the solvent is between about 250 mg/ml to about 350 mg/ml.

163. The method of clause 156, any other suitable clause, or any combination of suitable clauses, wherein the size of the flakes in the solvent is between about 0.25 $\mu m$ to about 250 $\mu m$.

164. The method of clause 156, any other suitable clause, or any combination of suitable clauses, wherein the size of the flakes in the solvent is between about 0.25 $\mu m$ to about 0.35 $\mu m$.

165. The method of clause 156, any other suitable clause, or any combination of suitable clauses, wherein the size of the flakes in the solvent is between about 0.25 $\mu m$ to about 1 nm.

166. The method of clause 156, any other suitable clause, or any combination of suitable clauses, wherein the size of the flakes in the solvent is between about 0.25 $\mu m$ to about 200 $\mu m$.

167. The method of clause 156, any other suitable clause, or any combination of suitable clauses, wherein the size of the flakes in the solvent is between about 5 $\mu m$ to about 100 nm.

168. The method of clause 156, any other suitable clause, or any combination of suitable clauses, wherein the size of the flakes in the solvent is between about 5 $\mu m$ to about 50 nm.

169. The method of clause 149, any other suitable clause, or any combination of suitable clauses, wherein the step of concentrating the dispersion comprises using superabsorbent polymer beads.

170. The method of clause 149, any other suitable clause, or any combination of suitable clauses, wherein the ink composition has a form selected from the group consisting of a colloidal particle, a colloidal dispersion, a colloidal suspension, a 2D nanomaterial, a nanomaterial dispersion, a nanomaterial suspension, and any combination thereof.

171. The method of clause 170, any other suitable clause, or any combination of suitable clauses, wherein the ink composition is a colloidal dispersion.

172. The method of clause 149, any other suitable clause, or any combination of suitable clauses, wherein the ink composition is substantially free of an additive.

173. The method of clause 172, any other suitable clause, or any combination of suitable clauses, wherein the additive is a conducting material.

174. The method of clause 172, any other suitable clause, or any combination of suitable clauses, wherein the additive is a polymer binder.

175. The method of clause 149, any other suitable clause, or any combination of suitable clauses, wherein the ink composition is substantially free of a surfactant.

176. The method of clause 175, any other suitable clause, or any combination of suitable clauses, wherein the surfactant is anionic.

177. The method of clause 175, any other suitable clause, or any combination of suitable clauses, wherein the surfactant is cationic.

178. The method of clause 175, any other suitable clause, or any combination of suitable clauses, wherein the surfactant is non-ionic.

179. The method of clause 149, any other suitable clause, or any combination of suitable clauses, wherein the ink composition is substantially free of a secondary solvent.
180. The method of clause 179, any other suitable clause, or any combination of suitable clauses, wherein the secondary solvent is an organic solvent.
181. The method of clause 179, any other suitable clause, or any combination of suitable clauses, wherein the secondary solvent is an inorganic solvent.
182. The method of clause 149, any other suitable clause, or any combination of suitable clauses, wherein the 2D material is a 2D nanomaterial.
183. The method of clause 149, any other suitable clause, or any combination of suitable clauses, wherein the 2D material is electrically conductive.
184. The method of clause 149, any other suitable clause, or any combination of suitable clauses, wherein the 2D material is a MXene composition.
185. The method of clause 184, any other suitable clause, or any combination of suitable clauses, wherein the MXene composition is a transition metal carbide.
186. The method of clause 184, any other suitable clause, or any combination of suitable clauses, wherein the MXene composition is a transition metal nitride.
187. The method of clause 184, any other suitable clause, or any combination of suitable clauses, wherein the MXene composition is of a general formula $N_{mL+1}Cs_nT_x$ (n−1, 2, or 3), where M denotes a transition metal, X is carbon and/or nitrogen, and $T_x$ denotes a surface functional group.
188. The method of clause 187, any other suitable clause, or any combination of suitable clauses, wherein M is selected from a group consisting of Ti, Cr, V, Mo, Zr, Sc, Mn, Nb, Y, W, Ta, and Hf.
189. The method of clause 187, any other suitable clause, or any combination of suitable clauses, wherein $T_x$ is selected from a group consisting of =O, =OH, and =F.
190. The method of clause 187, any other suitable clause, or any combination of suitable clauses, wherein $T_x$ is selected from a group consisting of =O, =OH, =Cl, =N, and =F.
191. The method of clause 184, any other suitable clause, or any combination of suitable clauses, wherein the MXene composition is $Ti_3C_2T_x$ and wherein $T_x$ denotes a surface functional group.
192. The method of clause 191, any other suitable clause, or any combination of suitable clauses, wherein $T_x$ is selected from a group consisting of =O, =OH, and =F.
193. The method of clause 191, any other suitable clause, or any combination of suitable clauses, wherein $T_x$ is selected from a group consisting of =O, =OH, =Cl, =N, and =F.
194. The method of clause 149, any other suitable clause, or any combination of suitable clauses, wherein the 2D material comprises a specific capacitance between about 20 F $cm^{-3}$ to about 2000 F $cm^{-3}$.
195. The method of clause 149, any other suitable clause, or any combination of suitable clauses, wherein the solvent is water.
196. The method of clause 195, any other suitable clause, or any combination of suitable clauses, wherein the ink composition comprises about 15% to about 85% water (wt %).
197. The method of clause 195, any other suitable clause, or any combination of suitable clauses, wherein the ink composition comprises about 25% to about 75% water (wt %).
198. The method of clause 195, any other suitable clause, or any combination of suitable clauses, wherein the ink composition comprises about 35% to about 75% water (wt %).
199. The method of clause 195, any other suitable clause, or any combination of suitable clauses, wherein the ink composition comprises about 50% to about 75% water (wt %).
200. The method of clause 195, any other suitable clause, or any combination of suitable clauses, wherein the ink composition comprises about 65% to about 75% water (wt %).
201. The method of clause 149, any other suitable clause, or any combination of suitable clauses, wherein the 2D material is dispersed in the solvent.
202. The method of clause 201, any other suitable clause, or any combination of suitable clauses, wherein the 2D material comprises flakes dispersed in the solvent.
203. The method of clause 202, any other suitable clause, or any combination of suitable clauses, wherein the flakes are delaminated.
204. The method of clause 202, any other suitable clause, or any combination of suitable clauses, wherein the flakes are arranged in a single layer in the solvent.
205. The method of clause 202, any other suitable clause, or any combination of suitable clauses, wherein the concentration of the flakes in the solvent is between about 50 mg/ml to about 750 mg/ml.
206. The method of clause 202, any other suitable clause, or any combination of suitable clauses, wherein the concentration of the flakes in the solvent is between about 50 mg/ml to about 500 mg/ml.
207. The method of clause 202, any other suitable clause, or any combination of suitable clauses, wherein the concentration of the flakes in the solvent is between about 100 mg/ml to about 400 mg/ml.
208. The method of clause 202, any other suitable clause, or any combination of suitable clauses, wherein the concentration of the flakes in the solvent is between about 250 mg/ml to about 350 mg/ml.
209. The method of clause 202, any other suitable clause, or any combination of suitable clauses, wherein the size of the flakes in the solvent is between about 0.25 μm to about 250 μm.
210. The method of clause 202, any other suitable clause, or any combination of suitable clauses, wherein the size of the flakes in the solvent is between about 0.25 μm to about 0.35 μm.
211. The method of clause 202, any other suitable clause, or any combination of suitable clauses, wherein the size of the flakes in the solvent is between about 0.25 μm to about 1 μm.
212. The method of clause 202, any other suitable clause, or any combination of suitable clauses, wherein the size of the flakes in the solvent is between about 0.25 μm to about 200 μm.
213. The method of clause 202, any other suitable clause, or any combination of suitable clauses, wherein the size of the flakes in the solvent is between about 5 μm to about 100 μm.
214. The method of clause 202, any other suitable clause, or any combination of suitable clauses, wherein the size of the flakes in the solvent is between about 5 μm to about 50 μm.
215. The method of clause 149, any other suitable clause, or any combination of suitable clauses, wherein the ink composition is viscoelastic.
216. The method of clause 149, any other suitable clause, or any combination of suitable clauses, wherein the ink composition has an elastic modulus and a viscous modulus, and wherein the elastic modulus is greater than the viscous modulus when measured at a frequency from about 0.01 Hz to about 10 Hz.
217. The method of clause 149, any other suitable clause, or any combination of suitable clauses, wherein the ink composition has a yield stress.

218. The method of clause 217, any other suitable clause, or any combination of suitable clauses, wherein the yield stress can be overcome in an extruder nozzle.
219. The method of clause 217, any other suitable clause, or any combination of suitable clauses, wherein the ink composition exhibits a shear thinning behavior above the yield stress.
220. The method of clause 149, any other suitable clause, or any combination of suitable clauses, wherein the ink composition is adapted for three dimensional (3D) printing.
221. The method of clause 220, any other suitable clause, or any combination of suitable clauses, wherein the ink composition is adapted for 3D printing of a micro-supercapacitor.
222. The method of clause 220, any other suitable clause, or any combination of suitable clauses, wherein the ink composition is adapted for 3D printing for an operation selected from the group consisting of an energy storage application, an electronic device, an electromagnetic shielding sensor, an antenna, a biomedical application and any combination thereof.
223. A method of fabricating a device, said method comprising the steps of:
dispersing a 2D material in a solvent to form a dispersion, and
printing the dispersion onto a substrate.
224. The method of clause 223, any other suitable clause, or any combination of suitable clauses, wherein the device is fabricated at room temperature.
225. The method of clause 223, any other suitable clause, or any combination of suitable clauses, wherein the method of fabricating the device further comprises drying the device in air.
226. The method of clause 223, any other suitable clause, or any combination of suitable clauses, wherein the ink composition has a form selected from the group consisting of a colloidal particle, a colloidal dispersion, a colloidal suspension, a 2D nanomaterial, a nanomaterial dispersion, a nanomaterial suspension, and any combination thereof.
227. The method of clause 226, any other suitable clause, or any combination of suitable clauses, wherein the ink composition is a colloidal dispersion.
228. The method of clause 223, any other suitable clause, or any combination of suitable clauses, wherein the ink composition is substantially free of an additive.
229. The method of clause 228, any other suitable clause, or any combination of suitable clauses, wherein the additive is a conducting material.
230. The method of clause 228, any other suitable clause, or any combination of suitable clauses, wherein the additive is a polymer binder.
231. The method of clause 223, any other suitable clause, or any combination of suitable clauses, wherein the ink composition is substantially free of a surfactant.
232. The method of clause 231, any other suitable clause, or any combination of suitable clauses, wherein the surfactant is wherein the surfactant is anionic.
233. The method of clause 231, any other suitable clause, or any combination of suitable clauses, wherein the surfactant is cationic.
234. The method of clause 231, any other suitable clause, or any combination of suitable clauses, wherein the surfactant is non-ionic.
235. The method of clause 223, any other suitable clause, or any combination of suitable clauses, wherein the ink composition is substantially free of a secondary solvent.
236. The method of clause 235, any other suitable clause, or any combination of suitable clauses, wherein the secondary solvent is an organic solvent.
237. The method of clause 235, any other suitable clause, or any combination of suitable clauses, wherein the secondary solvent is an inorganic solvent.
238. The method of clause 223, any other suitable clause, or any combination of suitable clauses, wherein the 2D material and the solvent form an ink composition.
239. The method of clause 238, any other suitable clause, or any combination of suitable clauses, wherein the 2D material is a 2D nanomaterial.
240. The method of clause 238, any other suitable clause, or any combination of suitable clauses, wherein the 2D material is electrically conductive.
241. The method of clause 238, any other suitable clause, or any combination of suitable clauses, wherein the 2D material is a MXene composition.
242. The method of clause 241, any other suitable clause, or any combination of suitable clauses, wherein the MXene composition is a transition metal carbide.
243. The method of clause 241, any other suitable clause, or any combination of suitable clauses, wherein the MXene composition is a transition metal nitride.
244. The method of clause 241, any other suitable clause, or any combination of suitable clauses, wherein the MXene composition has a general formula of $M_{n+1}X_nT_x$ (n–1, 2, or 3), where M denotes a transition metal, X is carbon and/or nitrogen, and $T_x$ denotes a surface functional group.
245. The method of clause 244, any other suitable clause, or any combination of suitable clauses, wherein M is selected from a group consisting of Ti, Cr, V, Mo, Zr, Sc, Mn, Nb, Y, W, Ta, and Hf.
246. The method of clause 244, any other suitable clause, or any combination of suitable clauses, wherein $T_x$ is selected from a group consisting of =O, =OH, and =F.
247. The method of clause 244, any other suitable clause, or any combination of suitable clauses, wherein $T_x$ is selected from a group consisting of =O, =OH, =Cl, =N, and =F.
248. The method of clause 241, any other suitable clause, or any combination of suitable clauses, wherein the MXene composition is $Ti_3C_2T_x$, and wherein $T_x$ denotes a surface functional group.
249. The method of clause 248, any other suitable clause, or any combination of suitable clauses, wherein $T_x$ is selected from a group consisting of =O, =OH, and =F.
250. The method of clause 248, any other suitable clause, or any combination of suitable clauses, wherein $T_x$ is selected from a group consisting of =O, =OH, =Cl, =N, and =F.
251. The method of clause 238, any other suitable clause, or any combination of suitable clauses, wherein the 2D material is dispersed in the solvent.
252. The method of clause 251, any other suitable clause, or any combination of suitable clauses, wherein the 2D material comprises flakes dispersed in the solvent.
253. The method of clause 252, any other suitable clause, or any combination of suitable clauses, wherein the flakes are delaminated.
254. The method of clause 252, any other suitable clause, or any combination of suitable clauses, wherein the flakes are arranged in a single layer in the solvent.
255. The method of clause 252, any other suitable clause, or any combination of suitable clauses, wherein the concentration of the flakes in the solvent is between about 50 mg/ml to about 750 mg/ml.

256. The method of clause 252, any other suitable clause, or any combination of suitable clauses, wherein the concentration of the flakes in the solvent is between about 50 mg/ml to about 500 mg/ml.

257. The method of clause 252, any other suitable clause, or any combination of suitable clauses, wherein the concentration of the flakes in the solvent is between about 100 mg/ml to about 400 mg/ml.

258. The method of clause 252, any other suitable clause, or any combination of suitable clauses, wherein the concentration of the flakes in the solvent is between about 250 mg/ml to about 350 mg/ml.

259. The method of clause 252, any other suitable clause, or any combination of suitable clauses, wherein the size of the flakes in the solvent is between about 0.25 μm to about 250 μm.

260. The method of clause 252, any other suitable clause, or any combination of suitable clauses, wherein the size of the flakes in the solvent is between about 0.25 μm to about 0.35 μm.

261. The method of clause 252, any other suitable clause, or any combination of suitable clauses, wherein the size of the flakes in the solvent is between about 0.25 μm to about 1 nm.

262. The method of clause 252, any other suitable clause, or any combination of suitable clauses, wherein the size of the flakes in the solvent is between about 0.25 μm to about 200 μm.

263. The method of clause 252, any other suitable clause, or any combination of suitable clauses, wherein the size of the flakes in the solvent is between about 5 μm to about 100 nm.

264. The method of clause 252, any other suitable clause, or any combination of suitable clauses, wherein the size of the flakes in the solvent is between about 5 μm to about 50 nm.

265. The method of clause 252, any other suitable clause, or any combination of suitable clauses, wherein the flakes are horizontally aligned when contacted on the substrate.

266. The method of clause 238, any other suitable clause, or any combination of suitable clauses, wherein the solvent is water.

267. The method of clause 266, any other suitable clause, or any combination of suitable clauses, wherein the ink composition comprises about 15% to about 85% water (wt %).

268. The method of clause 266, any other suitable clause, or any combination of suitable clauses, wherein the ink composition comprises about 25% to about 75% water (wt %).

269. The method of clause 266, any other suitable clause, or any combination of suitable clauses, wherein the ink composition comprises about 35% to about 75% water (wt %).

270. The method of clause 266, any other suitable clause, or any combination of suitable clauses, wherein the ink composition comprises about 50% to about 75% water (wt %).

271. The method of clause 266, any other suitable clause, or any combination of suitable clauses, wherein the ink composition comprises about 65% to about 75% water (wt %).

272. The method of clause 223, any other suitable clause, or any combination of suitable clauses, wherein the ink composition contacted on the substrate is printed on the substrate.

273. The method of clause 272, any other suitable clause, or any combination of suitable clauses, wherein the ink composition contacted on the substrate does not collapse after being printed on the substrate.

274. The method of clause 272, any other suitable clause, or any combination of suitable clauses, wherein the ink composition contacted on the substrate is printed on the substrate via direct ink writing (DIW).

275. The method of clause 272, any other suitable clause, or any combination of suitable clauses, wherein the ink composition contacted on the substrate is printed on the substrate via extrusion-based additive manufacturing.

276. The method of clause 272, any other suitable clause, or any combination of suitable clauses, wherein the ink composition contacted on the substrate is printed on the substrate through a nozzle.

277. The method of clause 272, any other suitable clause, or any combination of suitable clauses, wherein the ink composition contacted on the substrate is printed on the substrate through a syringe comprising an attached tip.

278. The method of clause 277, any other suitable clause, or any combination of suitable clauses, wherein the inner diameter of the attached tip is between about 20 μm to about 2 mm.

279. The method of clause 272, any other suitable clause, or any combination of suitable clauses, wherein the ink composition contacted on the substrate is two or more layers, and wherein the ink composition is printed on the substrate in a layer-by-layer manner.

280. The method of clause 223, any other suitable clause, or any combination of suitable clauses, wherein the ink composition contacted on the substrate provides a 3D structure.

281. The method of clause 223, any other suitable clause, or any combination of suitable clauses, wherein the ink composition is viscoelastic.

282. The method of clause 223, any other suitable clause, or any combination of suitable clauses, wherein the ink composition has an elastic modulus and a viscous modulus, and wherein the elastic modulus is greater than the viscous modulus when measured at a frequency from about 0.01 Hz to about 10 Hz.

283. The method of clause 223, any other suitable clause, or any combination of suitable clauses, wherein the ink composition has a yield stress.

284. The method of clause 283, any other suitable clause, or any combination of suitable clauses, wherein the yield stress can be overcome in an extruder nozzle.

285. The method of clause 283, any other suitable clause, or any combination of suitable clauses, wherein the ink composition exhibits a shear thinning behavior above the yield stress.

286. The method of clause 223, any other suitable clause, or any combination of suitable clauses, wherein the one or more layers of the ink composition contacted on the substrate each possess a height from about 1 μm to about 100 μm.

287. The method of clause 223, any other suitable clause, or any combination of suitable clauses, wherein the one or more layers of the ink composition contacted on the substrate comprise an electrode.

288. The method of clause 287, any other suitable clause, or any combination of suitable clauses, wherein the electrode possesses a height from about 1 μm to about 100 μm.

289. The method of clause 223, any other suitable clause, or any combination of suitable clauses, wherein the one or more layers of the ink composition contacted on the substrate comprise a first electrode and optionally comprise a second electrode.

290. The method of clause 289, any other suitable clause, or any combination of suitable clauses, wherein the first and second electrodes are contacted on the substrate in an interdigital configuration.

291. The method of clause 223, any other suitable clause, or any combination of suitable clauses, wherein the one or more layers of the ink composition contacted on the substrate comprise a current collector.

292. The method of clause 223, any other suitable clause, or any combination of suitable clauses, wherein the substrate is selected from a group consisting of glass, paper, a textile, a polymer film, a polymer coating, an inorganic film, an inorganic coating, a Si wafer, a $SiO_2$ wafer, and any combination thereof.

293. The method of clause 223, any other suitable clause, or any combination of suitable clauses, wherein the substrate is a textile and wherein the textile is cloth.

294. The method of clause 223, any other suitable clause, or any combination of suitable clauses, wherein the substrate is a textile and wherein the textile is fabric.

295. The method of clause 223, any other suitable clause, or any combination of suitable clauses, wherein the substrate is a film made from a colloidal dispersion.

296. The method of clause 223, any other suitable clause, or any combination of suitable clauses, wherein the substrate is a film made from a nanomaterial dispersion.

297. The method of clause 223, any other suitable clause, or any combination of suitable clauses, wherein the substrate is a wearable composition.

298. The method of clause 223, any other suitable clause, or any combination of suitable clauses, wherein in the substrate is a rigid substance.

299. The method of clause 223, any other suitable clause, or any combination of suitable clauses, wherein in the substrate is a flexible substance.

300. The method of clause 223, any other suitable clause, or any combination of suitable clauses, wherein the micro-supercapacitor composition comprises 2 layers of the ink composition contacted on the substrate.

301. The method of clause 223, any other suitable clause, or any combination of suitable clauses, wherein the micro-supercapacitor composition comprises 5 layers of the ink composition contacted on the substrate.

302. The method of clause 223, any other suitable clause, or any combination of suitable clauses, wherein the micro-supercapacitor composition comprises 10 layers of the ink composition contacted on the substrate.

303. The method of clause 223, any other suitable clause, or any combination of suitable clauses, wherein the micro-supercapacitor is fabricated at room temperature.

304. The method of clause 223, any other suitable clause, or any combination of suitable clauses, wherein the micro-supercapacitor composition has a volumetric capacitance between about 1 $F\ cm^{-3}$ to about 2000 $F\ cm^{-3}$.

305. The method of clause 223, any other suitable clause, or any combination of suitable clauses, wherein the micro-supercapacitor composition has a volumetric capacitance between about 100 $F\ cm^{-3}$ to about 1000 $F\ cm^{-3}$.

306. The method of clause 223, any other suitable clause, or any combination of suitable clauses, wherein the micro-supercapacitor composition has a volumetric capacitance between about 200 $F\ cm^{-3}$ to about 800 $F\ cm^{-3}$.

307. The method of clause 223, any other suitable clause, or any combination of suitable clauses, wherein the micro-supercapacitor composition has a volumetric capacitance between about 300 $F\ cm^{-3}$ to about 500 $F\ cm^{-3}$.

308. The method of clause 223, any other suitable clause, or any combination of suitable clauses, wherein the micro-supercapacitor composition has an areal capacitance between about 0.1 $F\ cm^{-2}$ to about 25 $F\ cm^{-2}$.

309. The method of clause 223, any other suitable clause, or any combination of suitable clauses, wherein the micro-supercapacitor composition has an areal capacitance between about 1 $F\ cm^{-2}$ to about 25 $F\ cm^{-2}$.

310. The method of clause 223, any other suitable clause, or any combination of suitable clauses, wherein the micro-supercapacitor composition has an areal capacitance between about 1 $F\ cm^{-2}$ to about 20 $F\ cm^{-3}$.

311. The method of clause 223, any other suitable clause, or any combination of suitable clauses, wherein the micro-supercapacitor composition has an areal capacitance between about 5 $F\ cm^{-2}$ to about 15 $F\ cm^{-3}$.

312. The method of clause 223, any other suitable clause, or any combination of suitable clauses, wherein the micro-supercapacitor composition has an energy density between about 1 $\mu Wh\ cm^{-2}$ to about 1000 $\mu Wh\ cm^{-2}$.

313. The method of clause 223, any other suitable clause, or any combination of suitable clauses, wherein the micro-supercapacitor composition has an energy density between about 10 $\mu Wh\ cm^{-2}$ to about 500 $\mu Wh\ cm^{-2}$.

314. The method of clause 223, any other suitable clause, or any combination of suitable clauses, wherein the micro-supercapacitor composition has an energy density between about 50 $\mu Wh\ cm^{-2}$ to about 500 $\mu Wh\ cm^{-2}$.

315. The method of clause 223, any other suitable clause, or any combination of suitable clauses, wherein the micro-supercapacitor composition has an energy density between about 100 $\mu Wh\ cm^{-2}$ to about 500 $\mu Wh\ cm^{-2}$.

316. The method of clause 223, any other suitable clause, or any combination of suitable clauses, wherein the micro-supercapacitor composition is a first micro-supercapacitor composition and wherein the first micro-supercapacitor composition can optionally be connected to a second micro-supercapacitor composition.

317. The method of clause 316, any other suitable clause, or any combination of suitable clauses, wherein the first micro-supercapacitor composition is connected to the second micro-supercapacitor composition in series.

318. The method of clause 316, any other suitable clause, or any combination of suitable clauses, wherein the first micro-supercapacitor composition is connected to the second micro-supercapacitor composition in parallel.

319. A conductive material comprising:
   a battery composition,
   an additive, and
   a solvent.

320. The conductive material of clause 319, any other suitable clause, or any combination of suitable clauses, wherein the additive is a MXene composition.

321. The conductive material of clause 320, any other suitable clause, or any combination of suitable clauses, wherein the MXene composition is a transition metal carbide.

322. The conductive material of clause 320, any other suitable clause, or any combination of suitable clauses, wherein the MXene composition is a transition metal nitride.

323. The conductive material of clause 320, any other suitable clause, or any combination of suitable clauses, wherein the MXene composition has a general formula of $M_{n+1}X_nT_x$ (n–1, 2, or 3), where M denotes a transition metal, X is carbon and/or nitrogen and $T_x$ denotes a surface functional group.

324. The conductive material of clause 323, any other suitable clause, or any combination of suitable clauses, wherein M is selected from a group consisting of Ti, Cr, V, Mo, Zr, Sc, Mn, Nb, Y, W, Ta, and Hf.

325. The conductive material of clause 323, any other suitable clause, or any combination of suitable clauses, wherein $T_x$ is selected from a group consisting of =O, =OH, and =F.

326. The conductive material of clause 323, any other suitable clause, or any combination of suitable clauses, wherein $T_x$ is selected from a group consisting of =O, =OH, =Cl, =N, and =F.

327. The conductive material of clause 320, any other suitable clause, or any combination of suitable clauses, wherein the MXene composition is $Ti_3C_2T_x$ and $T_x$ denotes a surface functional group.

328. The conductive material of clause 327, any other suitable clause, or any combination of suitable clauses, wherein $T_x$ is selected from a group consisting of =O, =OH, and =F.

329. The conductive material of clause 327, any other suitable clause, or any combination of suitable clauses, wherein $T_x$ is selected from a group consisting of =O, =OH, =Cl, =N, and =F.

330. The conductive material of clause 320, any other suitable clause, or any combination of suitable clauses, wherein the MXene composition comprises 2D MXene sheets.

331. The conductive material of clause 330, any other suitable clause, or any combination of suitable clauses, wherein the 2D MXene sheets have a length of about 0.5 µm to about 1 µm.

332. The conductive material of clause 330, any other suitable clause, or any combination of suitable clauses, wherein the 2D MXene sheets have a length of about 0.8 µm.

333. The conductive material of clause 330, any other suitable clause, or any combination of suitable clauses, wherein the 2D MXene sheets have a thickness of about 1 nm to about 2 µm.

334. The conductive material of clause 330, any other suitable clause, or any combination of suitable clauses, wherein the 2D MXene sheets have a thickness of about 1.6 µm.

335. The conductive material of clause 330, any other suitable clause, or any combination of suitable clauses, wherein the 2D MXene sheets have an aspect ratio of about 400 to about 600.

336. The conductive material of clause 330, any other suitable clause, or any combination of suitable clauses, wherein the 2D MXene sheets have an aspect ratio of about 500.

337. The conductive material of clause 319, any other suitable clause, or any combination of suitable clauses, wherein the additive is a conductive composition.

338. The conductive material of clause 319, any other suitable clause, or any combination of suitable clauses, wherein the additive is a binding agent.

339. The conductive material of clause 319, any other suitable clause, or any combination of suitable clauses, wherein the solvent comprises water.

340. The conductive material of clause 319, any other suitable clause, or any combination of suitable clauses, wherein the solvent consists essentially of water.

341. The conductive material of clause 319, any other suitable clause, or any combination of suitable clauses, wherein the solvent consists of water.

342. The conductive material of clause 319, any other suitable clause, or any combination of suitable clauses, wherein the battery composition is thermally stable.

343. The conductive material of clause 319, any other suitable clause, or any combination of suitable clauses, wherein the battery composition is an anode material or a cathode material.

344. The conductive material of clause 343, any other suitable clause, or any combination of suitable clauses, wherein the anode material or cathode material is for Li-ion, Na-ion, Mg-ion, Al-ion, Ca-ion, Zn-ion, and any combination thereof.

345. The conductive material of clause 319, any other suitable clause, or any combination of suitable clauses, wherein the battery composition is selected from the group consisting of lithium iron phosphate, lithium titanate, lithium cobalt oxide, lithium iron phosphate, lithium manganese oxide, lithium nickel cobalt aluminum oxide, lithium nickel manganese cobalt oxide, graphite, sulfur, silicon, and any combination thereof.

346. The conductive material of clause 319, any other suitable clause, or any combination of suitable clauses, wherein the battery composition is lithium iron phosphate.

347. The conductive material of clause 319, any other suitable clause, or any combination of suitable clauses, wherein the battery composition is lithium titanate.

348. The conductive material of clause 319, any other suitable clause, or any combination of suitable clauses, wherein the battery composition is lithium cobalt oxide.

349. The conductive material of clause 319, any other suitable clause, or any combination of suitable clauses, wherein the battery composition is lithium iron phosphate.

350. The conductive material of clause 319, any other suitable clause, or any combination of suitable clauses, wherein the battery composition is lithium manganese oxide.

351. The conductive material of clause 319, any other suitable clause, or any combination of suitable clauses, wherein the battery composition is lithium nickel cobalt aluminum oxide.

352. The conductive material of clause 319, any other suitable clause, or any combination of suitable clauses, wherein the battery composition is lithium nickel manganese cobalt oxide.

353. The conductive material of clause 319, any other suitable clause, or any combination of suitable clauses, wherein the battery composition is graphite.

354. The conductive material of clause 319, any other suitable clause, or any combination of suitable clauses, wherein the battery composition is sulfur.

355. The conductive material of clause 319, any other suitable clause, or any combination of suitable clauses, wherein the battery composition is silicon.

356. The conductive material of clause 319, any other suitable clause, or any combination of suitable clauses, wherein the battery composition is a transition metal oxide.

357. The conductive material of clause 319, any other suitable clause, or any combination of suitable clauses, wherein the battery composition is a nanoparticle composition.

358. The conductive material of clause 357, any other suitable clause, or any combination of suitable clauses, wherein the nanomaterial composition is selected from the group consisting of lithium iron phosphate nanoparticles, lithium titanate nanoparticles, lithium cobalt oxide nanoparticles, lithium iron phosphate nanoparticles, lithium manganese oxide nanoparticles, lithium nickel cobalt aluminum oxide nanoparticles, lithium nickel manganese cobalt oxide nanoparticles, graphite nanoparticles, sulfur nanoparticles, silicon nanoparticles, transition metal oxide nanoparticles, and any combination thereof.

359. The conductive material of clause 358, any other suitable clause, or any combination of suitable clauses, wherein the battery composition comprises lithium iron phosphate nanoparticles.

360. The conductive material of clause 359, any other suitable clause, or any combination of suitable clauses, wherein the lithium iron phosphate nanoparticles have a diameter between about 1 nm and about 1000 μm.

361. The conductive material of clause 319, any other suitable clause, or any combination of suitable clauses, wherein the conductive material comprises up to about 80% battery composition (wt %).

362. The conductive material of clause 319, any other suitable clause, or any combination of suitable clauses, wherein the conductive material further comprises sodium alginate.

363. The conductive material of clause 319, any other suitable clause, or any combination of suitable clauses, wherein the conductive material is adapted as an ink composition.

364. The conductive material of clause 363, any other suitable clause, or any combination of suitable clauses, wherein the ink composition is viscoelastic.

365. The conductive material of clause 363, any other suitable clause, or any combination of suitable clauses, wherein the ink composition has an elastic modulus and a viscous modulus, and wherein the elastic modulus is greater than the viscous modulus when measured at a frequency from about 0.01 Hz to about 10 Hz.

366. The conductive material of clause 363, any other suitable clause, or any combination of suitable clauses, wherein the ink composition is adapted for three dimensional (3D) printing.

367. The conductive material of clause 366, any other suitable clause, or any combination of suitable clauses, wherein the 3D printing comprises extrusion based additive manufacturing.

368. The conductive material of clause 367, any other suitable clause, or any combination of suitable clauses, wherein the conductive material is extruded through an extruder nozzle.

369. The conductive material of clause 368, any other suitable clause, or any combination of suitable clauses, wherein the additive comprises flakes dispersed in the solvent.

370. The conductive material of clause 369, any other suitable clause, or any combination of suitable clauses, wherein the flakes are aligned in an extrusion direction due to a shear force induced by the extruder nozzle.

371. The conductive material of clause 370, any other suitable clause, or any combination of suitable clauses, wherein the alignment of flakes enhances electrical conductivity of the ink composition.

372. The conductive material of clause 368, any other suitable clause, or any combination of suitable clauses, wherein the extruder nozzle comprises a printing pressure from about 2.5-5 psi to about 16-25 psi.

373. The conductive material of clause 366, any other suitable clause, or any combination of suitable clauses, wherein the ink composition is adapted for three dimensional (3D) printing of conductive structures.

374. The conductive material of clause 373, any other suitable clause, or any combination of suitable clauses, wherein the conductive structures does not require post-processing.

375. The conductive material of clause 366, any other suitable clause, or any combination of suitable clauses, wherein the ink composition is adapted for 3D printing of a micro-supercapacitor.

376. The conductive material of clause 366, any other suitable clause, or any combination of suitable clauses, wherein the ink composition is adapted for 3D printing of a battery.

377. The conductive material of clause 376, any other suitable clause, or any combination of suitable clauses, wherein the battery comprises an areal capacity from about 1 $mAh^{-2}$ to about 6 $mAh\ cm^{-2}$.

378. The conductive material of clause 376, any other suitable clause, or any combination of suitable clauses, wherein the battery comprises a current collector.

379. The conductive material of clause 376, any other suitable clause, or any combination of suitable clauses, wherein the battery comprises an electrode.

380. The conductive material of clause 379, any other suitable clause, or any combination of suitable clauses, wherein the electrode comprises low sheet resistance.

381. The conductive material of clause 379, any other suitable clause, or any combination of suitable clauses, wherein the electrode comprises a porous structure.

382. The conductive material of clause 379, any other suitable clause, or any combination of suitable clauses, wherein the battery comprises a $Ti_3C_2T_z$-LFP electrode.

383. The conductive material of clause 382, any other suitable clause, or any combination of suitable clauses, wherein the electrode comprises an areal specific capacity of about 5.05 $mAh\ cm^{-2}$ at a specific current density of about 0.2 $mA\ cm^{-2}$.

384. The conductive material of clause 382, any other suitable clause, or any combination of suitable clauses, wherein the electrode comprises an areal specific capacity of about 4.7 $mAh\ cm^{-2}$ at a specific current density of about 0.3 $mA\ cm^{-2}$.

385. The conductive material of clause 382, any other suitable clause, or any combination of suitable clauses, wherein the electrode comprises an areal specific capacity of about 3.9 $mAh\ cm^{-2}$ at a specific current density of about 0.5 $mA\ cm^{-2}$.

386. The conductive material of clause 382, any other suitable clause, or any combination of suitable clauses, wherein the electrode comprises an areal specific capacity of about 2.4 $mAh\ cm^{-2}$ at a specific current density of about 1 $mA\ cm^{-2}$.

387. The conductive material of clause 382, any other suitable clause, or any combination of suitable clauses, wherein the electrode comprises an areal specific capacity of about 1.5 $mAh\ cm^{-2}$ at a specific current density of about 2 $mA\ cm^{-2}$.

388. The conductive material of clause 379, any other suitable clause, or any combination of suitable clauses, wherein the battery comprise a $Ti_3C_2T_z$-LTO electrode.

389. The conductive material of clause 388, any other suitable clause, or any combination of suitable clauses, wherein the electrode comprises an areal specific capacity of about 5.8 $mAh\ cm^{-2}$ at a specific current density of about 0.1 $mA\ cm^{-2}$.

390. The conductive material of clause 388, any other suitable clause, or any combination of suitable clauses, wherein the electrode comprises an areal specific capacity of about 5.4 mAh cm$^{-2}$ at a specific current density of about 0.2 mA cm$^{-2}$.

391. The conductive material of clause 388, any other suitable clause, or any combination of suitable clauses, wherein the electrode comprises an areal specific capacity of about 5.0 mAh cm$^{-2}$ at a specific current density of about 0.5 mA cm$^{-2}$.

392. The conductive material of clause 388, any other suitable clause, or any combination of suitable clauses, wherein the electrode comprises an areal specific capacity of about 4.5 mAh cm$^{-2}$ at a specific current density of about 1 mA cm$^{-2}$.

393. The conductive material of clause 388, any other suitable clause, or any combination of suitable clauses, wherein the electrode comprises an areal specific capacity of about 3.6 mAh cm$^{-2}$ at a specific current density of about 2 mA cm$^{-2}$.

394. The conductive material of clause 388, any other suitable clause, or any combination of suitable clauses, wherein the electrode comprises an areal specific capacity of about 2.1 mAh cm$^{-2}$ at a specific current density of about 5 mA cm$^{-2}$.

395. The conductive material of clause 376, any other suitable clause, or any combination of suitable clauses, wherein a battery half-cell comprises a Coulombic efficiency of about 100%.

396. The conductive material of clause 376, any other suitable clause, or any combination of suitable clauses, wherein a battery full cell comprises an areal specific capacity of about 4.7 mAh cm$^{-2}$ at a specific current density of about 0.1 mA cm$^{-2}$.

397. The conductive material of clause 376, any other suitable clause, or any combination of suitable clauses, wherein a battery full cell comprises an areal specific capacity of about 3.7 mAh cm$^{-2}$ at a about specific current density of 0.2 mA cm$^{-2}$.

398. The conductive material of clause 376, any other suitable clause, or any combination of suitable clauses, wherein a battery full cell comprises an areal specific capacity of about 2.7 mAh cm$^{-2}$ at a specific current density of about 0.3 mA cm$^{-2}$.

399. The conductive material of clause 376, any other suitable clause, or any combination of suitable clauses, wherein a battery full cell comprises an areal specific capacity of about a 2.25 mAh cm$^{-2}$ at specific current density of about 0.5 mA cm$^{-3}$.

400. The conductive material of clause 376, any other suitable clause, or any combination of suitable clauses, wherein a battery full cell comprises an areal specific capacity of about 2 mAh cm$^{-2}$ at a specific current density of about 0.6 mA cm$^{-3}$.

401. The conductive material of clause 376, any other suitable clause, or any combination of suitable clauses, wherein a battery full cell comprises an areal specific capacity of about 1.7 mAh cm$^{-2}$ at a specific current density of about 1 mA cm$^{-2}$.

402. The conductive material of clause 376, any other suitable clause, or any combination of suitable clauses, wherein a battery full cell comprises an areal specific capacity of about 1.1 mAh cm$^{-2}$ at a specific current density of about 2 mA cm$^{-3}$.

403. The conductive material of clause 366, any other suitable clause, or any combination of suitable clauses, wherein the ink composition is adapted for 3D printing for an operation selected from the group consisting of an energy storage application, an electronic device, an electromagnetic shielding sensor, an antenna, a biomedical application and any combination thereof.

BRIEF DESCRIPTION OF THE DRAWINGS

FIG. 1A is an AFM image of the initial MXene dispersion confirming single-layer flakes. Inset is the height profile of the MXene flakes.

FIG. 1B is a schematic of the MXene solution at low and high concentrations; adding SAP beads to the dispersion resulted in a uniform concentrated MXene solution. Steady shear rheological behavior (FIG. 1C) blue diamonds viscosity and line Herschel-Bulkley model fit, and (FIG. 1D) highlighting the dramatic viscosity drop at the yield stress. Small amplitude oscillatory shear (SAOS) data (FIG. 1E) show G' (top line of diamonds)>G" (bottom line of diamonds) and G' nearly constant over the measured frequency range, and (FIG. 1F) ratio of G' to G" over the measured frequency range. Note: error bars represent standard error (n=5 for SAOS data and n=10 for steady shear data).

FIG. 2A shows super absorbent polymer (SAP) balls were used to remove excess water from the prepared $Ti_3C_2T_x$ dispersion and increase its concentration. FIG. 2B shows highly concentrated MXene ink prepared for 3D printing. The ink showed suitable viscoelastic properties. FIG. 2C shows a representative AFM image of the MXene flakes in the developed ink. The MXene flakes in the ink have an average size of 0.3 μm.

FIGS. 3A-3E show that the prepared MXene ink was used to print MSCs with different designs and number of layers. FIGS. 3A and 3B show printed interdigital MSCs before drying. FIG. 3C shows a top-view image of MSC-1 and MSC-2 after drying.

FIG. 3D shows a photograph of MSC-12 device printed on a glass substrate before drying, showing the good adhesion of the printed electrodes to the substrate and the stability of the printed electrodes in wet condition. FIG. 3E shows printing a device with 15 sets of interdigital electrodes with high accuracy on a glass substrate.

FIG. 5A and FIG. 5B show the top view SEM images of MSC-1 and MSC-7, respectively. These images show the accuracy of the printing process in replicating the designed shape of the electrodes. The first printed layer was wider than the latter printed layers (scale bar is 100 μm). FIG. 5C and FIG. 5D show the side view SEM images showing long rang horizontal orientation of MXene flakes in direction of nozzle movement with low (100×) and high (430×) magnifications (scale bar is 100 and 10 µm, respectively). FIG. 5E and FIG. 5F show high magnification cross-section images of an electrodes with 10 printed layers showing the alignment of flakes (scale bar is 10 µm).

FIG. 6A shows the top view SEM images of MSCF-1 device showing the formation of continues film after drying (scale bar is 10 µm).

FIG. 6B shows the low (scale bar is 1 mm) and FIG. 6C shows the high (scale bar is 100 µm) magnification SEM images of MSCF-5 device printed on a polymer substrate. For the polymer substrate, the first printed layer (current collector) was not as wide as the first printed layer on the glass substrate due to the higher contact angle of ink on the polymer substrate. FIG. 6D shows the low magnification and FIG. 6E shows the high magnification (scale bars are 100 µm and 10 µm, respectively) side view SEM images of MSCF-5, showing long rang horizontal orientation of MXene flakes in the direction of nozzle movement. FIG. 6F shows the high magnification cross-sectional SEM images of an electrode in MSCF-5 device (scale bar is 10 µm).

FIG. 7C and FIG. 7D show top view images of MSC-4 printed on a paper substrate (scale bar is 100 µm) showing the fingers and corners, respectively.

FIGS. 8A and 8B show low magnification top view SEM images of MSC-1 and MSC-2 (scale bar is 1 mm), respectively. FIGS. 8C and 8D show MSC-1 and MSC-2 printed devices current collector and finger junction part (scale bar is 100 µm), respectively. FIGS. 8E and 8F show MSC-1 and MSC-2 fingertips, respectively.

FIG. 9A shows CV curves of MSC-1 at various scan rates. FIG. 9B shows CV curves at 5 mV s-1 for different MSCs. FIG. 9C shows voltage versus time curves for MSC-1 at various current densities. FIG. 9D shows voltage vs. time curves at 0.5 mA cm-2 for different MSCs. FIG. 9E shows areal capacitance as a function of scan rate for various fabricated MSCs. The inset graph shows the CA derived from fitting data to Equation 2 as a function of mass loading of printed electrodes. The dashed curves represent data fitted to Equation 2. FIG. 9F shows current density versus scan rate (at V=0.3 V) for different MSCs FIG. 10A shows CV curves at a scan rate of 2 mV s$^{-1}$ and FIG. 10B shows Nyquist plots for MSC-1, MSC-2, MSC-5, and MSC-10.

FIGS. 11A-11C show normalized CV curves for MSC-2, MSC-5, and MSC-10, respectively. FIGS. 11D-11F show GCD curves for MSC-2, MSC-5, and MSC-10, respectively. The active material loading per area for MSC-1, MSC-2, MSC-5, MSC-10 were calculated to be 3.54 mg cm$^{-2}$, 4.33 mg cm$^{-2}$, 6.73 mg cm$^{-2}$, and 10.72 mg cm$^{-2}$, respectively.

FIG. 12A shows the printed devices showed excellent adhesion to the substrate during repeated bending and twisting. FIG. 12B shows CV curves of MSCF-1 at various scan rates. FIG. 12C shows CV curves at 5 mV s$^{-1}$ for different MSCFs. FIG. 12D shows areal capacitance versus scan rate for various flexible MSCFs. The inset graph shows $C_A$ derived from fitting the experimental data to Equation 2 as a function of mass loading of the electrodes in MSCFs. FIG. 12E shows electrochemical performance of MSCF-1 at a 10 mV s$^{-1}$ scan rate under various bending angles (starting with 60° followed by 120°, 180°, and 0°). FIG. 12F shows areal capacitance versus scan rate for MSCF-1 device at different bending angles. The inset graph shows the τ calculated based on Equation 2 for MSCF-1 device under different bending angles. FIG. 12G shows voltage profile of fabricated MSCs at 0.2 mA cm$^{-2}$ for different number of cells connected in series. In (d), (f), the dashed lines show the Equation 2 fits.

FIG. 14A and FIG. 14B show the CV curve and calculated areal capacitance, respectively. The dash line represents the fitting of calculated capacitance to equation 2.

FIGS. 16A-16C show schematic of ink development, printing, and electrode structure, respectively. FIG. 16D shows the AFM image of Ti3C2Tz flakes showing the MXene disoersion consist of single layer flakes. FIGS. 16E-16F SEM images and EDS analysis, respectively, of Ti3C2Tz+LFP ink showing the nanoparticles are uniformly mixed in the MXene dispersion. FIGS. 16G-16H show SEM images and EDS analysis, respectively, of Ti3C2Tz+LTO ink. FIG. 16I shows XRD of developed inks confirming there is no phase change after mixing.

FIGS. 17A-17B show the effect of changing P (at constant $S_N$, H) and $S_N$ (at constant P, H) on pure MXene ink printed line width (gaje 25). FIG. 17C shows the load of active material and height of printed features as a function of the number of printed layers for MXene and MXene-LFP inks. FIG. 17D shows the sheet resistance, $R_s$, plotted as a function of the number of printed layers for MXene and MXene LFP inks.

FIG. 18A shows the top view image and FIG. 18B shows a cross-section image.

FIGS. 19A-19C demonstrate the effect of P, $S_N$, and H on the line width of printed MXene+LFP ink, respectively.

FIG. 20A shows that steady shear rheology indicates shear-thinning behavior and higher viscosities for the larger MX sheet dispersions. FIG. 20B shows that oscillatory behavior illustrates larger G' than G" across entire frequency sweep for all the dispersions. Error bars are standard deviation.

FIG. 21A shows an optical image of 1,3, and 5 times printed electrode structures. FIG. 21B and FIG. 21C show side-view SEM images of 2 times and 4 times printed lines, respectively. FIG. 21D shows a cross-section SEM image of 4 layers of printed ink showing good mechanical stability of printed lines. FIG. 21E and FIG. 21F show cross-section SEM images of MXene+LFP and MXene+LTO composite electrodes at different magnifications.

FIGS. 22A and 22B show the rate capability and voltage profile of $Ti_3C_2T_z$-LFP and $Ti_3C_2T_z$-LTO, respectively. FIGS. 22C and 22D show the cycling performance of 3D printed $Ti_3C_2T_z$-LFP and $Ti_3C_2T_z$-LTO electrodes. FIG. 22E shows the voltage profile of 3D printed $Ti_3C_2T_z$-LFP and $Ti_3C_2T_z$-LTO full cell at different scan rates. FIG. 22F shows the ragone plot comparing areal capacity versus current density for the MXene-based 3D printed cell compared with previously reported values FIG. 23A shows a schematic of the glass cell used to evaluate the electrochemical performance of the fabricated 3D printed Li-ion microbatteries. FIG. 23B shows a voltage profile the tested full cell at different scan rates. FIG. 23C shows cycling stability and Coulombic efficiency of fabricated 3D printed devices.

DETAILED DESCRIPTION

Figures 1A, 1B, 1C, 1D, 1E, 1F:
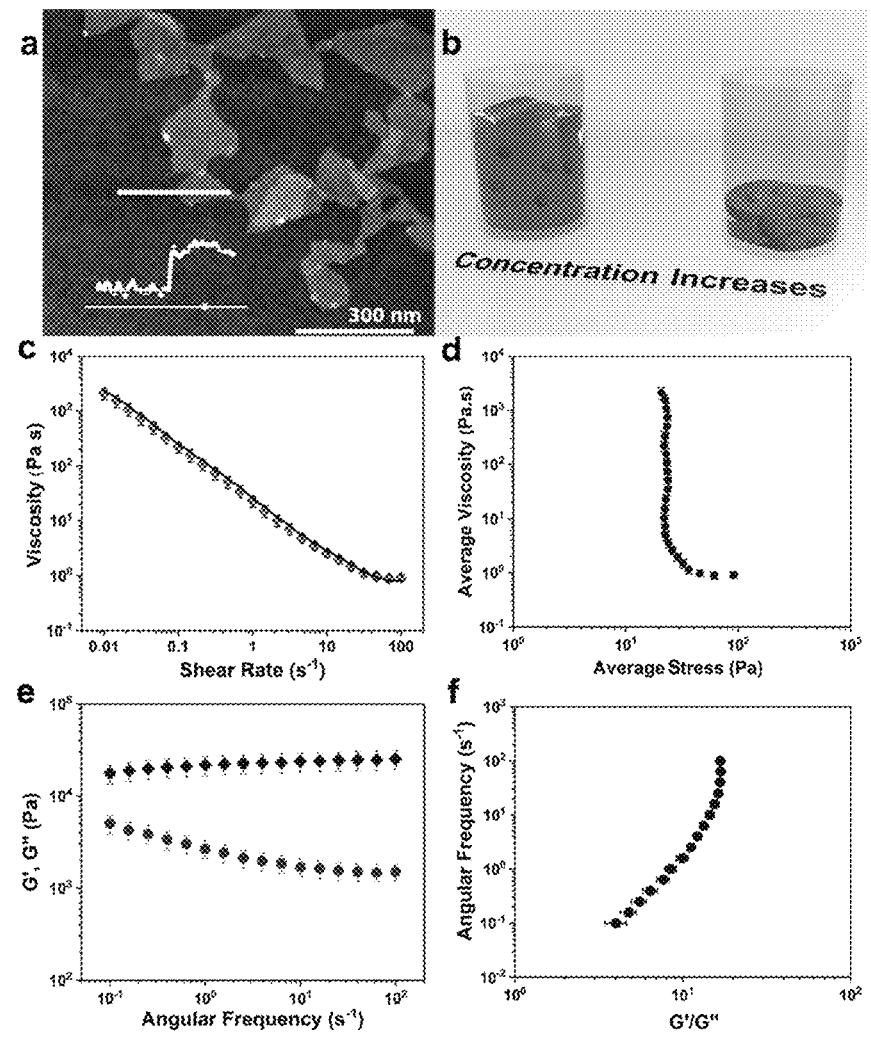
FIGS. 1A-1F show a schematic of MXene ink preparation and 290 mg mL-1 (~28.9 wt %) MXene ink rheology.

In one aspect, an ink composition is provided. The ink composition comprises a 2D material and a solvent.

In an embodiment, the ink composition has a form selected from the group consisting of a colloidal particle, a colloidal dispersion, a colloidal suspension, a 2D nanomaterial, a nanomaterial dispersion, a nanomaterial suspension, and any combination thereof. In some embodiments, the ink composition is a colloidal dispersion. The term "colloidal" is known in the art and generally refers to a state of subdivision in which the molecules or polymolecular particles dispersed in a medium have at least in one direction a dimension roughly between 1 nm and 1 μm, or that in a system discontinuities are found at distances of that order.

In an embodiment, the ink composition is substantially free of an additive. As used herein, the term "substantially free" refers to zero or nearly no detectable amount of a material, quantity, or item. For example, the amount can be less than 2 percent, less than 0.5 percent, less than 0.1 percent, or less than 0.01 percent of the material, quantity, or item. In some embodiments, the ink composition does not comprise additives. In some embodiments, the additive is a conducting material. In other embodiments, the additive is a polymer binder.

In an embodiment, the ink composition is substantially free of a surfactant. In some embodiments, the surfactant is anionic. In some embodiments, the surfactant is cationic. In some embodiments, the surfactant is non-ionic.

In an embodiment, the ink composition is substantially free of a secondary solvent. In some embodiments, the ink composition wherein the surfactant is an organic solvent. In some embodiments, the ink composition wherein the surfactant is an inorganic solvent.

In an embodiment, the 2D material is a 2D nanomaterial. As used herein, the term "nanomaterial" refers to a material having a size measured on the nanometer scale. For example, it may refers to a material having a structure with a size of less than about 1,000 nanometers.

In an embodiment, the 2D material is electrically conductive.

In an embodiment, the 2D material is a MXene composition. In some embodiments, the MXene composition is a transition metal carbide. In some embodiments, the MXene composition is a transition metal nitride. In some embodiments, the MXene composition is of a general formula $M_{n+1}X_nT_x$ (n=1, 2, or 3), where M denotes a transition metal, X is carbon and/or nitrogen, and $T_x$ denotes a surface functional group. In some embodiments, M is selected from a group consisting of Ti, Cr, V, Mo, Zr, Sc, Mn, Nb, Y, W, Ta, and Hf. In some embodiments, $T_x$ is selected from a group consisting of =O, =OH, and =F. In some embodiments, $T_x$ is selected from a group consisting of =O, =OH, =Cl, =N, and =F. In some embodiments, the MXene composition is $Ti_3C_2T_x$ and $T_x$ denotes a surface functional group. In some embodiments, $T_x$ is selected from a group consisting of =O, =OH, and =F. In some embodiments, $T_x$ is selected from a group consisting of =O, =OH, =Cl, =N, and =F. As used herein, the term "surface functional group" refers to a specific group of atoms or bonds responsible for a characteristic chemical property or reaction.

In an embodiment, 2D material comprises a specific capacitance between about 20 F cm$^{-3}$ to about 2000 F cm$^{-3}$. In an embodiment, 2D material comprises a specific capacitance between about 100 F cm$^{-3}$ to about 2000 F cm$^{-3}$. In an embodiment, 2D material comprises a specific capacitance between about 100 F cm$^{-3}$ to about 1800 F cm$^{-3}$. In an embodiment, 2D material comprises a specific capacitance between about 250 F cm$^{-3}$ to about 2000 F cm$^{-3}$. In an embodiment, 2D material comprises a specific capacitance between about 500 F cm$^{-3}$ to about 1800 F cm$^{-3}$. In an embodiment, 2D material comprises a specific capacitance between about 1000 F cm$^{-3}$ to about 2000 F cm$^{-3}$. In an embodiment, 2D material comprises a specific capacitance between about 1200 F cm$^{-3}$ to about 1800 F cm$^{-3}$. In an embodiment, 2D material comprises a specific capacitance between about 1200 F cm$^{-3}$ to about 1600 F cm$^{-3}$. In an embodiment, 2D material comprises a specific capacitance between about 1300 F cm$^{-3}$ to about 1500 F cm$^{-3}$.

In an embodiment, the solvent is water. In some embodiments, the ink composition comprises about 15% to about 85% water (wt %). In some embodiments, the ink composition comprises about 25% to about 75% water (wt %). In some embodiments, the ink composition comprises about 35% to about 75% water (wt %). In some embodiments, the ink composition comprises about 50% to about 75% water (wt %). In some embodiments, the ink composition comprises about 65% to about 75% water (wt %).

In an embodiment, the 2D material is dispersed in the solvent. In some embodiments, the 2D material comprises flakes dispersed in the solvent. In some embodiments, the flakes are delaminated. In some embodiments, the flakes are arranged in a single layer in the solvent. In some embodiments, the concentration of the flakes in the solvent is between about 50 mg/ml to about 750 mg/ml. In some embodiments, the concentration of the flakes in the solvent is between about 50 mg/ml to about 500 mg/ml. In some embodiments, the concentration of the flakes in the solvent is between about 100 mg/ml to about 400 mg/ml. In some embodiments, the concentration of the flakes in the solvent is between about 250 mg/ml to about 350 mg/ml. In some embodiments, the size of the flakes in the solvent is between about 0.25 µm to about 250 µm. In some embodiments, the size of the flakes in the solvent is between about 0.25 µm to about 0.35 µm. wherein the size of the flakes in the solvent is between about 0.25 µm to about 1 µm. In some embodiments, the size of the flakes in the solvent is between about 0.25 µm to about 200 µm. In some embodiments, the size of the flakes in the solvent is between about 5 µm to about 100 µm. In some embodiments, the size of the flakes in the solvent is between about 5 µm to about 50 µm.

In an embodiment, the ink composition is viscoelastic. In an embodiment, the ink composition has an elastic modulus and a viscous modulus, and wherein the elastic modulus is greater than the viscous modulus when measured at a frequency from about 0.01 Hz to about 10 Hz.

In an embodiment, the ink composition has a yield stress. As used herein, the term "yield stress" refers to the stress level at which a material ceases to behave elastically. In some embodiments, the yield stress can be overcome in an extruder nozzle. In some embodiments, the ink composition exhibits a shear thinning behavior above the yield stress.

In an embodiment, the ink composition is adapted for three dimensional (3D) printing. In some embodiments, the ink composition is adapted for 3D printing of a micro-supercapacitor. In some embodiments, the ink composition is adapted for 3D printing for an operation selected from the group consisting of an energy storage application, an electronic device, an electromagnetic shielding sensor, an antenna, a biomedical application and any combination thereof.

In another aspect, a micro-supercapacitor (MSC) composition is provided. The MSC composition comprises one or more layers of an ink composition contacted on a substrate. The previously described embodiments of the ink compositions are applicable to the micro-supercapacitor (MSC) compositions described herein.

In an embodiment, the ink composition contacted on the substrate is printed on the substrate. In some embodiments, the ink composition contacted on the substrate does not collapse after being printed on the substrate. In some embodiments, the ink composition contacted on the substrate is printed on the substrate via direct ink writing (DIW). In some embodiments, the ink composition contacted on the substrate is printed on the substrate via extrusion-based additive manufacturing. In some embodiments, the ink composition contacted on the substrate is printed on the substrate through a nozzle. In some embodiments, the ink composition contacted on the substrate is printed on the substrate through a syringe comprising an attached tip.

In some embodiments, the inner diameter of the attached tip is between about 20 µm to about 2 mm. In some embodiments, the inner diameter of the attached tip is between about 1 mm to about 2 mm. In some embodiments, the inner diameter of the attached tip is between about 20 µm to about 1 mm. In some embodiments, the inner diameter of the attached tip is between about 20 µm to about 800 µm. In some embodiments, the inner diameter of the attached tip is between about 100 µm to about 600 nm. In some embodiments, the inner diameter of the attached tip is between about 200 µm to about 500 µm. In some embodiments, the inner diameter of the attached tip is between about 200 µm to about 400 µm. In some embodiments, the inner diameter of the attached tip is between about 200 µm to about 300 µm. In some embodiments, the inner diameter of the attached tip is between about 230 µm to about 260 µm.

In some embodiments, the ink composition contacted on the substrate is two or more layers. In some embodiments, the ink composition is printed on the substrate in a layer-by-layer manner.

In an embodiment, the ink composition contacted on the substrate provides a 3D structure.

In an embodiment, the one or more layers of the ink composition contacted on the substrate each possess a height from about 1 µm to about 100 µm.

In an embodiment, the one or more layers of the ink composition contacted on the substrate comprise an electrode. In some embodiments, the electrode possesses a height from about 1 µm to about 100 µm.

In an embodiment, the one or more layers of the ink composition contacted on the substrate comprise a first electrode and optionally comprise a second electrode. In some embodiments, the first and second electrodes are contacted on the substrate in an interdigital configuration.

In an embodiment, the one or more layers of the ink composition contacted on the substrate comprise a current collector.

In an embodiment, the substrate is selected from a group consisting of glass, paper, a textile, a polymer film, a polymer coating, an inorganic film, an inorganic coating, a Si wafer, a $SiO_2$ wafer, and any combination thereof.

In an embodiment, the substrate is a textile. In some embodiments, the textile is cloth. In an embodiment, the substrate is a textile. In some embodiments, the textile is fabric. In an embodiment, the substrate is a film made from a colloidal dispersion. In an embodiment, the substrate is a film made from a nanomaterial dispersion. In an embodiment, the substrate is a wearable composition. In an embodiment, in the substrate is a rigid substance. In an embodiment, in the substrate is a flexible substance.

In an embodiment, the micro-supercapacitor composition comprises 2 layers of the ink composition contacted on the substrate.

In an embodiment, the micro-supercapacitor composition comprises 5 layers of the ink composition contacted on the substrate.

In an embodiment, the micro-supercapacitor composition comprises 10 layers of the ink composition contacted on the substrate.

In an embodiment, the micro-supercapacitor is fabricated at room temperature.

In an embodiment, the micro-supercapacitor composition has a volumetric capacitance between about 1 F $cm^{-3}$ to about 2000 F $cm^{-3}$. In an embodiment, the micro-supercapacitor composition has a volumetric capacitance between about 100 F $cm^{-3}$ to about 1000 F $cm^{-3}$. In an embodiment, the micro-supercapacitor composition has a volumetric capacitance between about 200 F $cm^{-3}$ to about 800 F $cm^{-3}$. In an embodiment, the micro-supercapacitor composition has a volumetric capacitance between about 300 F $cm^{-3}$ to about 500 F $cm^{-3}$.

In an embodiment, the micro-supercapacitor composition has an areal capacitance between about 0.1 F $cm^{-2}$ to about 25 F $cm^{-2}$. In an embodiment, the micro-supercapacitor composition has an areal capacitance between about 1 F $cm^{-2}$ to about 25 F $cm^{-2}$. In an embodiment, the micro-supercapacitor composition has an areal capacitance between about 1 F $cm^{-2}$ to about 20 F $cm^{-2}$. In an embodiment, the micro-supercapacitor composition has an areal capacitance between about 5 F $cm^{-2}$ to about 15 F $cm^{-2}$.

In an embodiment, the micro-supercapacitor composition has an energy density between about 1 µWh $cm^{-2}$ to about 1000 µWh $cm^{-2}$. In an embodiment, the micro-supercapacitor composition has an energy density between about 10 µWh cm$^{-2}$ to about 500 µWh cm$^{-2}$. In an embodiment, the micro-supercapacitor composition has an energy density between about 50 µWh cm$^{-2}$ to about 500 µWh cm$^{-2}$. In an embodiment, the micro-supercapacitor composition has an energy density between about 100 µWh cm$^{-2}$ to about 500 µWh cm$^{-2}$.

In an embodiment, the micro-supercapacitor composition is a first micro-supercapacitor composition and wherein the first micro-supercapacitor composition can optionally be connected to a second micro-supercapacitor composition. In some embodiments, the first micro-supercapacitor composition is connected to the second micro-supercapacitor composition in series. In some embodiments, the first micro-supercapacitor composition is connected to the second micro-supercapacitor composition in parallel.

In another aspect, a method for manufacturing an ink composition is provided. The method comprises the steps of dispersing a 2D material in a solvent to form a dispersion, and concentrating the dispersion. The previously described embodiments of the ink compositions and the micro-supercapacitor (MSC) composition are applicable to the methods for manufacturing an ink composition described herein.

In an embodiment, the step of dispersing the 2D material comprises combining the 2D material and the solvent to form the dispersion. As used herein, the term "dispersion" refers to a homogenous mixture of one material in a continuous phase of another material. In some embodiments, the step of dispersing the 2D material further comprises sonicating the dispersion. In some embodiments, sonicating the dispersion comprises tip sonication. In some embodiments, the tip sonication is done for about 5 minutes to about 120 minutes. In some embodiments, the tip sonication is done for about 15 minutes to about 100 minutes. In some embodiments, the tip sonication is done for about 25 minutes to about 35 minutes. In some embodiments, sonicating the dispersion comprises forming flakes dispersed in the solvent.

In an embodiment, the step of concentrating the dispersion comprises using superabsorbent polymer beads. As used herein, the term "superabsorbent" refers to a material that retain a large amount of liquid relative to its own mass.

In another aspect, a method of fabricating a device is provided. The method comprises the steps of dispersing a 2D material in a solvent to form a dispersion, and printing the dispersion onto a substrate. The previously described embodiments of the ink compositions, the micro-supercapacitor (MSC) compositions, and the methods for manufacturing an ink composition are applicable to the methods for fabricating a device described herein.

In an embodiment, the device is fabricated at room temperature. As used herein, the term "room temperature" refers to a comfortable ambient temperature. For example, it may refer to a temperature from about 65° F. to about 80° F.

In an embodiment, the method of fabricating the device further comprises drying the device in air.

In an embodiment, the 2D material is dispersed in the solvent. In some embodiments, the 2D material comprises flakes dispersed in the solvent. In some embodiments, the flakes are horizontally aligned when contacted on the substrate.

In another aspect, a conductive material is provided. The conductive material comprises a battery composition, an additive, and a solvent. The previously described embodiments of the ink compositions, the micro-supercapacitor (MSC) compositions, and the methods are applicable to the conductive materials described herein.

In an embodiment, the additive is a MXene composition. In some embodiments, the MXene composition comprises 2D MXene sheets. In some embodiments, the 2D MXene sheets have a length of about 0.5 µm to about 1 µm. In some embodiments, the 2D MXene sheets have a length of about 0.8 µm. In some embodiments, the 2D MXene sheets have a thickness of about 1 nm to about 2 µm. In some embodiments, the 2D MXene sheets have a thickness of about 1.6 µm. In some embodiments, the 2D MXene sheets have an aspect ratio of about 400 to about 600. In some embodiments, the 2D MXene sheets have an aspect ratio of about 500.

In an embodiment, the additive is a conductive composition. In an embodiment, the additive is a binding agent. In an embodiment, the solvent comprises water. In some embodiments, the solvent consists essentially of water. In some embodiments, the solvent consists of water. In an embodiment, the battery composition is thermally stable. In an embodiment, the battery composition is an anode material or a cathode material. In some embodiments, the anode material or cathode material is for Li-ion, Na-ion, Mg-ion, Al-ion, Ca-ion, Zn-ion, and any combination thereof.

In an embodiment, the battery composition is selected from the group consisting of lithium iron phosphate, lithium titanate, lithium cobalt oxide, lithium iron phosphate, lithium manganese oxide, lithium nickel cobalt aluminum oxide, lithium nickel manganese cobalt oxide, graphite, sulfur, silicon, and any combination thereof. In an embodiment, the battery composition is lithium iron phosphate. In an embodiment, the battery composition is lithium titanate. In an embodiment, the battery composition is lithium cobalt oxide. In an embodiment, the battery composition is lithium iron phosphate. In an embodiment, the battery composition is lithium manganese oxide. In an embodiment, the battery composition is lithium nickel cobalt aluminum oxide. In an embodiment, the battery composition is lithium nickel manganese cobalt oxide. In an embodiment, the battery composition is graphite. In an embodiment, the battery composition is sulfur. In an embodiment, the battery composition is silicon. In an embodiment, the battery composition is a transition metal oxide.

In an embodiment, the battery composition is a nanoparticle composition. In some embodiments, the nanomaterial composition is selected from the group consisting of lithium iron phosphate nanoparticles, lithium titanate nanoparticles, lithium cobalt oxide nanoparticles, lithium iron phosphate nanoparticles, lithium manganese oxide nanoparticles, lithium nickel cobalt aluminum oxide nanoparticles, lithium nickel manganese cobalt oxide nanoparticles, graphite nanoparticles, sulfur nanoparticles, silicon nanoparticles, transition metal oxide nanoparticles, and any combination thereof. In some embodiments, the battery composition comprises lithium iron phosphate nanoparticles.

In some embodiments, the lithium iron phosphate nanoparticles have a diameter between about 1 nm and about 1000 µm. On some embodiments, the lithium iron phosphate nanoparticles have a diameter between about 10 nm and about 800 µm. In other embodiments, the lithium iron phosphate nanoparticles have a diameter between about 50 nm and about 600 µm. In other embodiments, the lithium iron phosphate nanoparticles have a diameter between about 100 nm and about 500 µm. In other embodiments, the lithium iron phosphate nanoparticles have a diameter between about 100 nm and about 400 µm. In other embodiments, the lithium iron phosphate nanoparticles have a diameter between about 100 nm and about 300 µm. In certain embodiments, the lithium iron phosphate nanoparticles have a diameter of about 200 μm. As used herein, the term, "nanoparticle" refers to a particle having a size measured on the nanometer scale. For example, it may refer to a particle having a structure with a size of less than about 1,000 nanometers. As used herein, the term "nanoparticle composition" refers to any substance that contains at least one nanoparticle.

In an embodiment, the conductive material comprises up to about 80% battery composition (wt %).

In an embodiment, the conductive material further comprises sodium alginate.

In an embodiment, the conductive material is adapted as an ink composition. In some embodiments, the ink composition is adapted for three dimensional (3D) printing. In some embodiments, the 3D printing comprises extrusion based additive manufacturing. In some embodiments, the conductive material is extruded through an extruder nozzle. In some embodiments, the additive comprises flakes dispersed in the solvent. In some embodiments, the flakes are aligned in an extrusion direction due to a shear force induced by the extruder nozzle. In some embodiments, the alignment of flakes enhances electrical conductivity of the ink composition. In some embodiments, the extruder nozzle comprises a printing pressure from about 2.5-5 psi to about 16-25 psi. In some embodiments, the ink composition is adapted for three dimensional (3D) printing of conductive structures. In some embodiments, the conductive structures does not require post-processing. In some embodiments, the ink composition is adapted for 3D printing of a battery. In some embodiments, the battery comprises an areal capacity from about 1 mAh$^{-2}$ to about 6 mAh cm$^{-2}$. In some embodiments, the battery comprises a current collector. In some embodiments, the battery comprises an electrode. In some embodiments, the electrode comprises low sheet resistance. In some embodiments, the electrode comprises a porous structure. In some embodiments, the battery comprises a $Ti_3C_2T_z$-LFP electrode. In some embodiments, the electrode comprises an areal specific capacity of about 5.05 mAh cm$^{-2}$ at a specific current density of about 0.2 mA cm$^{-2}$. In some embodiments, the electrode comprises an areal specific capacity of about 4.7 mAh cm$^{-2}$ at a specific current density of about 0.3 mA cm$^{-3}$. In some embodiments, the electrode comprises an areal specific capacity of about 3.9 mAh cm$^{-2}$ at a specific current density of about 0.5 mA cm$^{-2}$. In some embodiments, the electrode comprises an areal specific capacity of about 2.4 mAh cm$^{-2}$ at a specific current density of about 1 mA cm$^{-2}$. In some embodiments, the electrode comprises an areal specific capacity of about 1.5 mAh cm$^{-2}$ at a specific current density of about 2 mA cm$^{-2}$. In some embodiments, the battery comprise a $Ti_3C_2T_z$-LTO electrode. In some embodiments, the electrode comprises an areal specific capacity of about 5.8 mAh cm$^{-2}$ at a specific current density of about 0.1 mA cm$^{-3}$. In some embodiments, the electrode comprises an areal specific capacity of about 5.4 mAh cm$^{-2}$ at a specific current density of about 0.2 mA cm$^{-2}$. In some embodiments, the electrode comprises an areal specific capacity of about 5.0 mAh cm$^{-2}$ at a specific current density of about 0.5 mA cm$^{-2}$. In some embodiments, the electrode comprises an areal specific capacity of about 4.5 mAh. cm$^{-2}$ at a specific current density of about 1 mA cm$^{-2}$. In some embodiments, the electrode comprises an areal specific capacity of about 3.6 mAh cm$^{-2}$ at a specific current density of about 2 mA cm$^{-2}$. In some embodiments, the electrode comprises an areal specific capacity of about 2.1 mAh cm$^{-2}$ at a specific current density of about 5 mA cm$^{-2}$. In some embodiments, a battery half-cell comprises a Coulombic efficiency of about 100%.

In some embodiments, a battery full cell comprises an areal specific capacity of about 4.7 mAh cm$^{-2}$ at a specific current density of about 0.1 mA cm$^{-2}$. In some embodiments, a battery full cell comprises an areal specific capacity of about 3.7 mAh cm$^{-2}$ at a about specific current density of 0.2 mA cm$^{-3}$. In some embodiments, a battery full cell comprises an areal specific capacity of about 2.7 mAh cm$^{-2}$ at a specific current density of about 0.3 mA cm$^{-2}$. In some embodiments, a battery full cell comprises an areal specific capacity of about a 2.25 mAh cm$^{-2}$ at specific current density of about 0.5 mA cm$^{-2}$. In some embodiments, a battery full cell comprises an areal specific capacity of about 2 mAh cm$^{-2}$ at a specific current density of about 0.6 mA cm$^{-2}$. In some embodiments, a battery full cell comprises an areal specific capacity of about 1.7 mAh cm$^{-2}$ at a specific current density of about 1 mA cm$^{-2}$. In some embodiments, a battery full cell comprises an areal specific capacity of about 1.1 mAh cm$^{-2}$ at a specific current density of about 2 mA cm$^{-2}$.

Example 1

MAX Phases Synthesis

The synthesis of $Ti_3AlC_2$ MAX phase was performed in 2 steps. First, $Ti_2AlC$ MAX phase was synthesized by mixing TiC powder (99.5% Alfa Aesar), Ti powder (99.5%, Alfa Aesar), and Al powder (99.5%, 325 mesh, Alfa Aesar) in a 1:1:1 molar ratio. The mixture was ball milled for 24 hours, then sintered at 1400° C. for 2 h under flowing Argon with a 5° C./min heating rate. The resulting material was milled into a fine powder, sieved, and $Ti_2AlC$ powder with a particle size of less than 38 μm was used in the next step. For the synthesis of $Ti_3AlC_2$, the resulting $Ti_2AlC$ powder was mixed with TiC powder (99.5% Alfa Aesar) in a 1:1 molar ratio, ball milled for 24 h and then sintered at 1400° C. for 2 h under flowing Argon with a 10° C./min heating rate. The resulting sintered material was milled, sieved, and particles of less than 38 μm were used for MXene ink preparation.

MXene Synthesis

The $Ti_3C_2T_x$ suspension was prepared as follows. Briefly, concentrated hydrochloric acid (HCl, ACS Grade, BDH) solution was diluted with DI water to obtain 40 mL of 6 M HCl solution. 2 g lithium fluoride (LiF, 98+% purity, Alfa Aesar) was added to the solution and stirred for 10 minutes using a Teflon coated magnetic stir bar at room temperature. The solution was then moved to an ice bath, and 2 g of $Ti_3AlC_2$ powder was slowly added to the solution (to prevent overheating). The resulting mixture was transferred to a hot bath (35° C.) and kept for 24 hours (stirring at 550 rpm). The mixture was then washed several times with DI water and centrifuged at 3500 rpm until the supernatant pH was ~6. The MXene powder was then collected (filtered using a Celgard® porous membrane), redispersed in DI water, and sonicated for 30 min. The resulting suspension was centrifuged at 3500 rpm for 1 hour, and the supernatant was collected and used as the initial solution. The dispersions of $Ti_3C_2T_x$ flakes in water were prepared in which $Ti_3C_2T_x$ was dispersed in DI water and tip sonicated to produce delaminated MXene flakes.

Ink Preparation

The printable MXene ink was produced to be substantially free of additives or and without the requirement of high-temperature drying, which can affect the properties of $Ti_3C_2T_x$. Although functionalized $Ti_3C_2T_x$ is hydrophilic, and preparation of a stable dispersion of its 2D flakes in water may be previously demonstrated, such colloidal dispersions are usually prepared at relatively low concentrations which lack the favorable rheological properties required for extrusion printing.

The instant example directly utilizes the exemplary MXene solution described previously. Super absorbing polymers (SAP) beads were used to absorb water from the solution while the solution was stirred continuously at 400 rpm to prevent possible concentration gradient and to speed up the absorption process. The SAP beads could be easily collected from the solution (after saturation) and replaced by new beads to precisely tune the solution concentration. This step was repeated until a homogeneous and highly concentrated solution was achieved. During the water absorption step a small amount of $Ti_3C_2T_x$ flakes may adhere to the surface of SAP beads but they may be easily removed with DI water. The hydrogel beads change to their initial shape by simply keeping them at room temperature for a few days to evaporate the absorbed water.

Example 2

Atomic Force Microscope (AFM)

AFM (Park Systems, NX10) was used to measure the size and thickness of the synthesized $Ti_3C_2T_x$ flakes. To prepare the AFM samples, a small amount of the solution was diluted with DI water and drop-casted on the pieces of thermally oxidized silicon wafers.

Atomic force microscopy (AFM) measurements showed that the synthesized MXenes are mostly single-layer flakes with an average lateral dimension of ~0.3 μm (FIG. 1A). However, the concentration of the prepared dispersions (~10 mg mL$^{-1}$) may be too low to achieve the rheological properties required for extrusion printing and, thus, increasing the concentration of MXene dispersions was undertaken.

The instant example uses superabsorbent polymer (SAP) for concentrating $Ti_3C_2T_x$ dispersions (FIGS. 2A-2C). As schematically demonstrated in FIG. 1B, the dispersion concentration was uniformly increased to as high as 290 mg mL$^{-1}$ (~28.9 wt %), thus preparing highly concentrated MXene dispersions. The concentrated ink contained MXene flakes with an average flake size of ~0.3 μm and could be directly used for 3D printing of MSCs. (FIGS. 2A-2C and 3A-3E).

Rheology and Viscoelastic Properties

Rheological properties of the prepared MXene inks were evaluated using a strain-controlled rotational rheometer (Physica MCR301, Anton Paar). Fixture geometries (made of stainless steel) used for testing were parallel-plates (25 mm diameter) and cone and plate (25 mm diameter, cone angle=0.03 rad) to ensure there are no artifacts in the data due to testing geometry. After loading the rheometer with MXene ink at 25° C., multiple time points (up to 2 hours) were selected to allow the sample to equilibrate and eliminate viscoelastic history before the investigation of rheological properties. A time of 20 minutes was chosen for evaluation since no significant change was observed in elastic and storage moduli at a strain amplitude of 0.01 and steady shear viscosity data. All experiments were performed with a silicone oil coating along the edges of the fixtures and a solvent trap of deionized water to prevent water loss due to extended testing. A preliminary shear protocol was established at a shear rate of 0.01 s$^{-1}$ to prevent structure change before measuring oscillatory dynamics.

Achieving good dispersion quality, including homogeneity and controlled rheological properties, is important for the line width and uniformity of printed structures. Shear thinning behavior (FIG. 1C) above yield stress (FIG. 1D) that can be overcome in the print head is essential for a uniform flow out of a narrow orifice. FIG. 1C shows that the viscosity versus shear rate behavior of the 28.9 wt % ($\varphi=7.5\times10^{-2}$) $Ti_3C_2T_x$ ink could be fit to Herschel-Bulkley model $$\tau=\tau_0+k\dot{\gamma}^n \qquad (1)$$

where $\tau_0$ is the yield stress, $\dot{\gamma}$ is the shear rate, and k is the consistency factor, and n is the flow index. This resulted in the model parameters $\tau_0=24$, k=1.07, and n=0.73, where the model maintains <10% error with the data. FIG. 1D highlights the dramatic decrease in viscosity that occurs at the yield stress.

The structure of the layers printed with MXene ink, including shape retention and interlayer adhesion, can be influenced by ink viscoelastic properties. An elastic modulus G' greater than the viscous modulus G" (tan δ<1) enables the printed tracks to retain their shape while still having enough viscous character to enable interlayer coalescence. FIG. 1E shows that for the prepared MXene ink G' is greater than G" throughout the measured frequency range; the lower frequencies probe the long-timescale dynamics of the microstructural rearrangement prior to solidification while the higher frequencies probe shorter time scales. FIG. 1E also shows that G' is nearly independent of frequency indicating a percolated (continuous) network of sheets even prior to the concentration increase accompanying solvent evaporation. The inverse of tan δ or G'/G" versus frequency ω is increasingly being used to establish whether an ink has suitable viscoelastic behavior for specific processes including electrospraying, inkjet printing, fiber spinning, and extrusion printing. The ink of the present disclosure was observed to have a frequency range of 0.01<ω<10 Hz, which is appropriate for a 3D printing process (FIG. 1F).

Example 3

3D Printing

The first step in 3D printing of MSCs was the preparation of a printable MXene ink as described above. A benchtop robotic dispenser (Fisnar F4200n) was used for the 3D printing of MXene ink. The desired pattern was designed (AutoCAD, Autodesk Inc), transferred to the robotic dispenser, and printed using control software. The ink flow was controlled by a pneumatic fluid dispenser (DSP501N, Fisnar), the pressure of the dispenser and the printhead speed were ~4 psi and ~3 mm s$^{-1}$, respectively. For printing interdigital electrodes with various height, after printing the first layer (current collector), the ink was deposited layer by layer on the finger part of the interdigital electrodes to increase the height of the electrodes.

Fabrication of MSCs

A glass substrate (MAS-GP, Matsunami Glass, IND., LTD., Japan) was cleaned with DI water and used for printing. Although the ink has high conductivity and could be used as both current collector and active material, that the instant example used the sputtering of a thin layer of gold on the substrate (underneath the printed current collectors) to improve the electrochemical performance of the devices. The gel polymer (PVA/H$_2$SO$_4$) electrolyte was prepared by first adding 1 g of PVA powder to 10 ml DI water with continues stirring at 85° C. until a clear solution was achieved. Then, 1 mL of H$_2$SO$_4$ (95.0-98.0%, ACS, Alfa Aesar, USA) was added to the mixture and stirred for another 1 h.

Figures 4A, 4B, 4C, 4D, 4E, 4F, 4G, 4H:
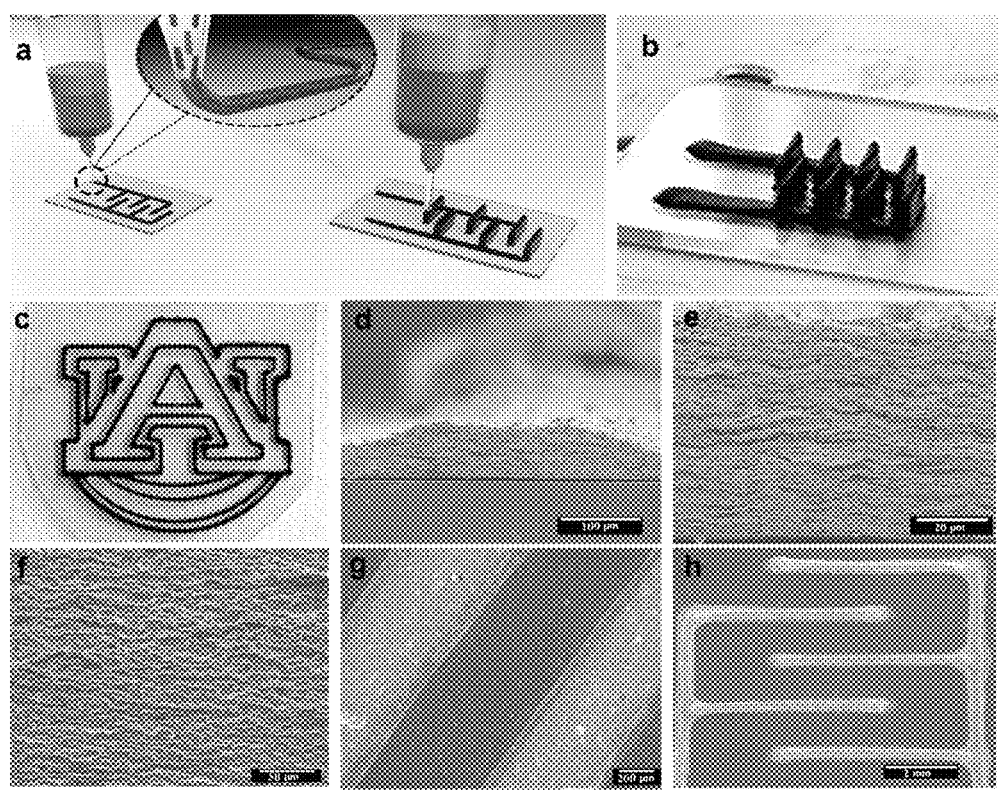
FIG. 4A shows a schematic drawing demonstrating the 3D printing of MSCs with interdigital architectures. The shear stress induced in the nozzle aligns the flakes resulting in their horizontal alignment in the direction of nozzle movement. The height of the printed electrodes can be increased by printing additional layers.
FIG. 4B shows an optical image of MSC-10 device printed on a glass substrate before drying.
FIG. 4C shows an optical image of the Auburn University logo printed on a polymer substrate using the prepared MXene ink (with permission from Auburn University, copyright 2019, Auburn University).
FIGS. 4D-4E show cross-sectional SEM images of the electrodes in MSC-10 device in different magnifications showing that $Ti_3C_2T_x$ flakes are compactly stacked and horizontally aligned.
FIG. 4F shows a side-view SEM image of MSC-10 showing alignment of $Ti_3C_2T_x$ flakes. Top-view SEM image of (FIG. 4G) MSC-1 device and (FIG. 4H) MSC-5 device printed on glass and polymer substrates, respectively.
Figures 5A, 5B, 5C, 5D, 5E, 5F:
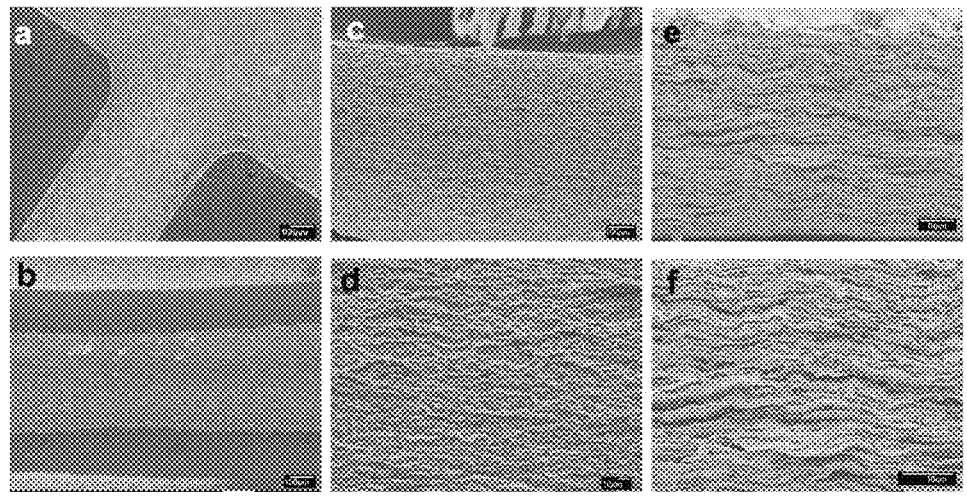
FIGS. 5A-5F show SEM images of the 3D printed interdigital electrodes with different thicknesses on a glass substrate.
Figures 6A, 6B, 6C, 6D, 6E, 6F:
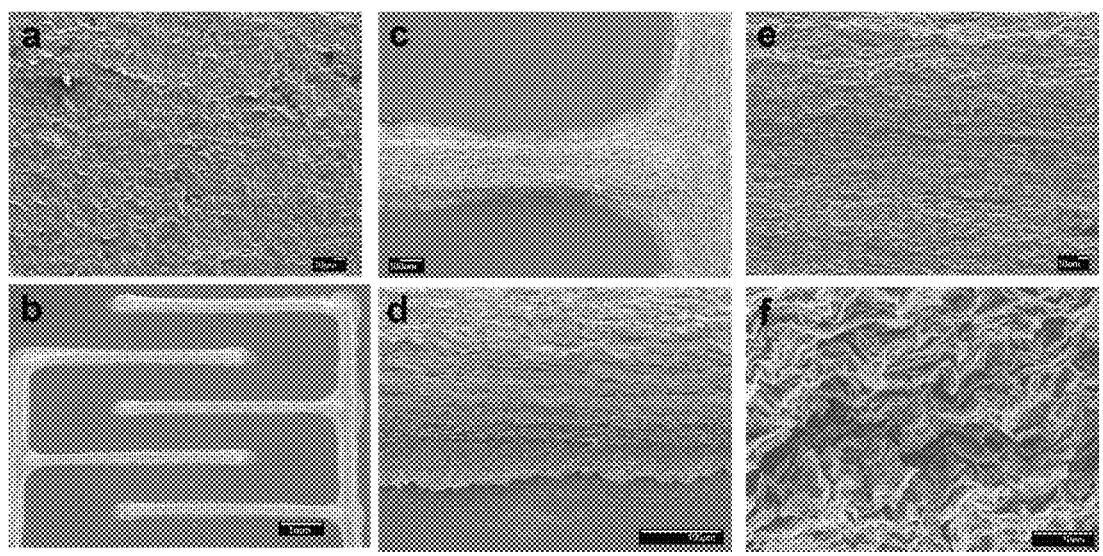
FIGS. 6A-6F show SEM images of 3D MSCF devices with different thicknesses printed on polymer substrates.
Figures 7A, 7B, 7C, 7D:
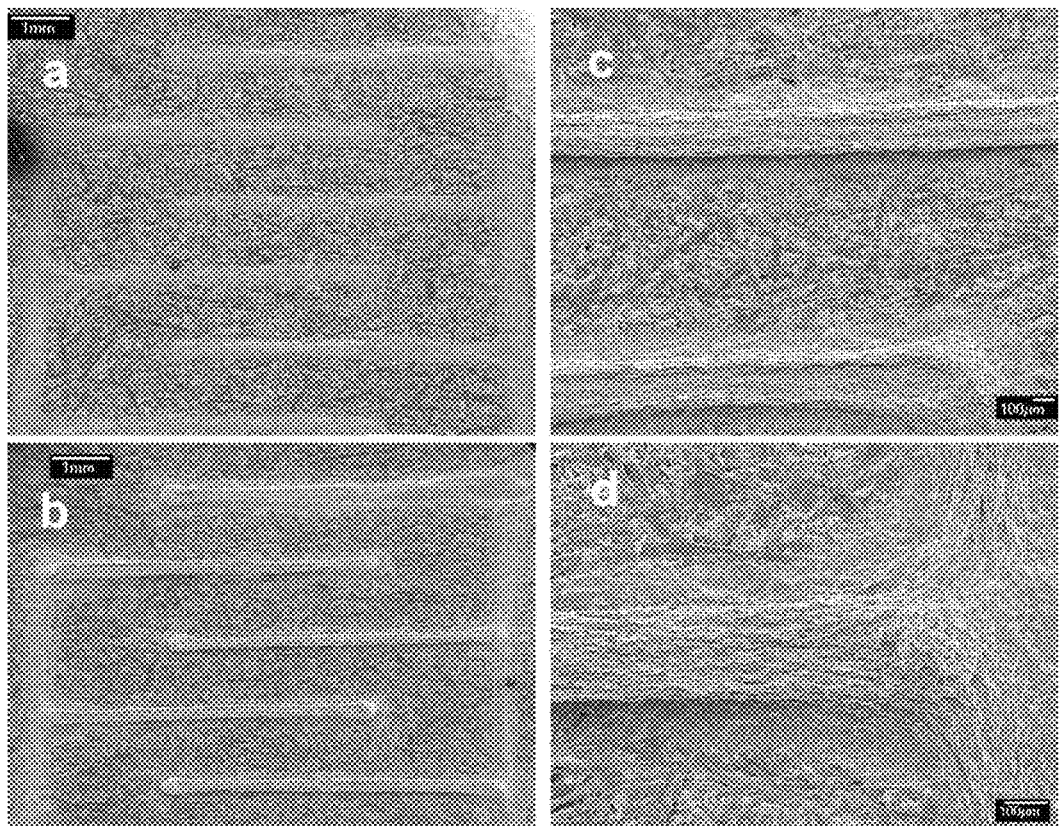
FIGS. 7A-7D show SEM images of 3D printed interdigital electrodes with different thicknesses printed on paper substrates. Low magnification (12×) top view SEM images electrodes MSC-1 (FIG. 7A) and MSC-4 (FIG. 7B) (scale bar is 1 mm)
Figures 8A, 8B, 8C, 8D, 8E, 8F:
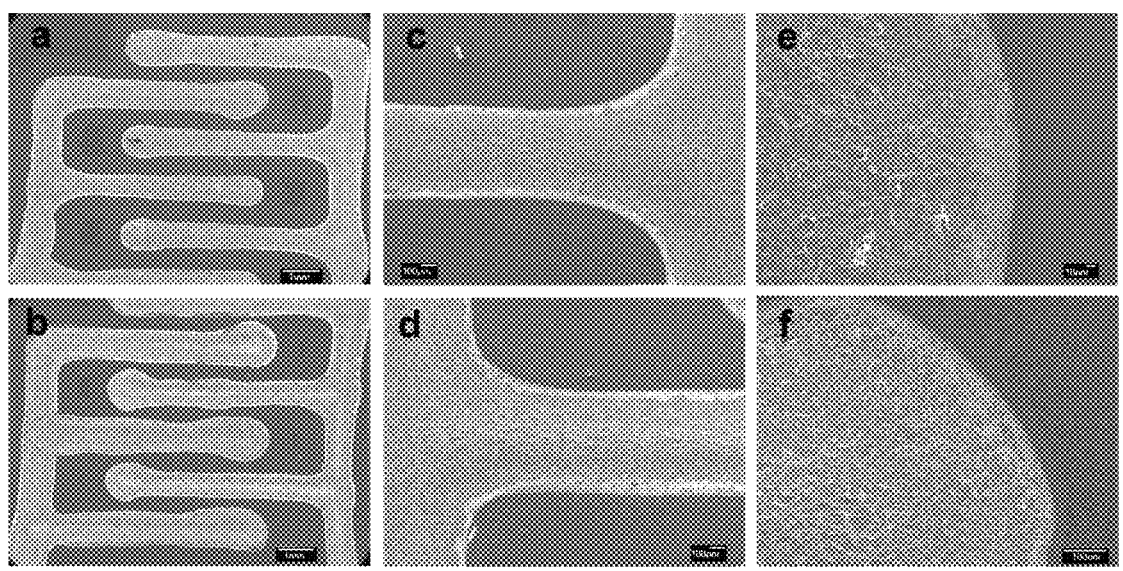
FIGS. 8A-8F show SEM images of 3D interdigital electrodes with different thicknesses printed on a SiO$_2$/Si wafer substrate.

After material preparation and rheological measurements, the MXene ink was loaded into syringes with an attached tip (230-600 µm inner diameter) and used for 3D printing by a robotic dispenser (schematically shown in FIG. 4A). The ink was printed into fine lines and predetermined shapes in a layer-by-layer fashion. MSCs with interdigital architectures were fabricated using the prepared ink for printing both current collectors and 3D electrodes. Due to the viscoelastic properties of the Ti$_3$C$_2$T$_x$ MXene ink, the deposited layers were mechanically robust, and multiple layers could be stacked to achieve printed electrodes several millimeters in height without collapse (FIG. 4B). Moreover, a variety of shapes and geometries may be printed with fabricated ink. For instance, the Auburn University logo with all its fine features was printed, as shown in FIG. 4C.

The produced MXene inks contained approximately ~71 wt % of water and drying the electrodes in air could result in the shrinkage of the printed electrodes. Interestingly, the electrodes mostly shrunk along the height of the electrodes; the shrinkage along the length and width of the electrodes was minimal. This is attributed to contact line pinning between the deposited MXene ink and hydrophilic substrates. After complete drying, the electrodes' thickness was reduced to between a few microns and one millimeter (depending on the number of deposited layers), which can be a more appropriate height range for on-chip energy storage devices.

MSCs with interdigital electrodes were printed on various substrates including glass slides, polymer films, papers, and Si/SiO$_2$ wafer (see FIGS. 5A-5F, 6A-6F, 7A-7D, 8A-8F). For the fabrication of each device first the current collectors were printed, and then additional layers were printed only on the finger part of the patterns to the desired height (schematically shown in FIG. 4A). MSCs with higher electrode thickness were printed by increasing the number of deposited layers to 2, 5, and 10 layers. The fabricated devices were then labeled as MSC-n, where n designates the number of printed layers for interdigital electrodes in each device (e.g., MSC-10 has 10 layers of printed MXene ink). The measured height of the electrodes after drying at room temperature for MSC-1, -2, -5, and -10 were about 1.5, 3.5, 12, and 75 µm, respectively. The length and width of the interdigital electrodes, as well as the gap distance between electrodes, can be engineered by changing the size of the features in the designed device and adjusting the nozzle size and printing conditions. FIGS. 4D-4F show cross-sectional scanning electron microscope (SEM) images of electrodes in MSC-10 device, which show that the printed MXene flakes are horizontally aligned. Without being bound by any theory, it is believed that this is due to the alignment of flakes in the nozzle during extrusion and their shear alignment in the direction of the nozzle movement during the printing. FIG. 4G-4H shows top-view SEM images of MSCs with a different number of layers printed on glass and polymer substrates, respectively.

Example 4

Electrochemical Measurements

The fabricated symmetrical 3D MSCs electrochemical performance were tested using a VMP3 potentiostat (Bio-logic, France) using pieces of silver wire to connect the printed current collectors to the potentiostat cables. Silver wires were connected to the current collectors by a silver adhesive (fast-drying Ag paint, SPI Supplies). To protect the silver paint and wires from the electrolyte, nail polish was used to cover the contact area. The prepared PVA/H$_2$SO$_4$ gel electrolyte was carefully drop cast onto the printed Ti$_3$C$_2$T$_x$ interdigital electrodes and then dried in air overnight. Two-electrode configuration was used to test the printed devices. Cyclic voltammetry tests were performed at scan rates ranging from 2 to 1000 mVs$^{-1}$ in a potential window of 0 to 0.6 V to avoid oxidation of MXene.[28] Electrochemical impedance spectroscopy was performed at open circuit potential, with a small sinusoidal amplitude of 5 mV, and frequencies of 10 mHz to 100 kHz. The areal, gravimetric, and volumetric capacitances were used to evaluate the electrochemical performance of the printed MSCs.

Cell capacitance (C/A) was derived from the CV curve, according to the following equations.

$$C = \frac{\int I(V)dv}{\upsilon \cdot \Delta V}(F),$$

(2-electrode configuration)
where 'I(V)' was the voltammetric discharge current (mA), 'u' is the scan rate (mV s$^{-1}$), ΔV is the potential window (0.6 V).

The normalized areal (C/A) and volumetric (C/V) capacitances were calculated based on the total area and volume of the devices. The total area (A) was calculated considering the area of the interdigital electrodes and the space between the fingers and the total volume (V) was calculated by multiplying the total area by the maximum thickness of fingers (height of the electrodes) measured from SEM images. The following equations were used for calculating the normalized capacitances:

$$C/A = \frac{C_{device}}{A}$$

and $$C/V = \frac{C_{device}}{V}$$

The power and energy densities of the devices were measured according to the following equations:

$$\text{Energy density}(E) = \frac{C/A * V^2}{7200}(\text{Wh cm}^{-2})$$

$$\text{Power density}(P) = \frac{3.6 * E * \upsilon}{V}(\text{Wh cm}^{-2}).$$

where C/A (F cm$^{-2}$), V (V), and υ (mV s$^{-1}$) are as described above.

Figures 9A, 9B, 9C, 9D, 9E, 9F:
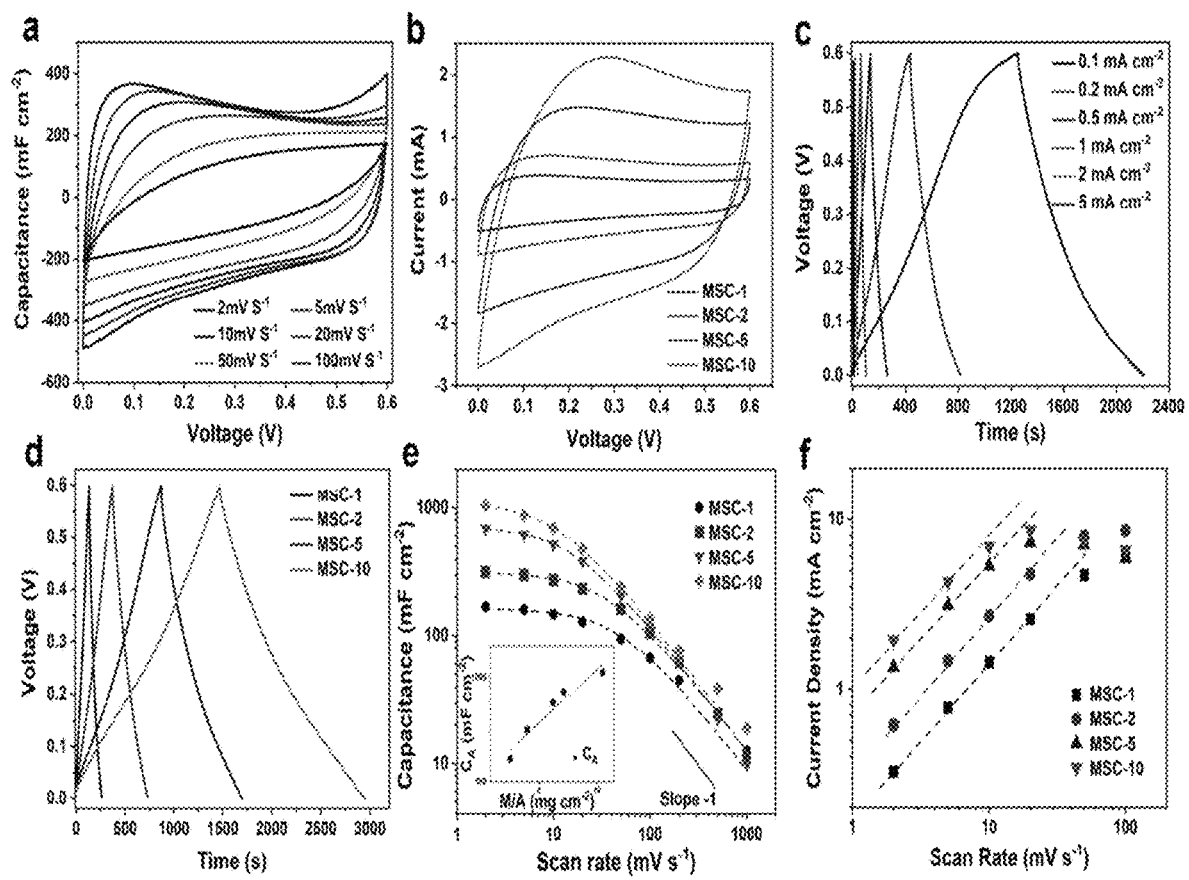
FIGS. 9A-9F show electrochemical performance of all-MXene MSCs.
Figures 10A, 10B:
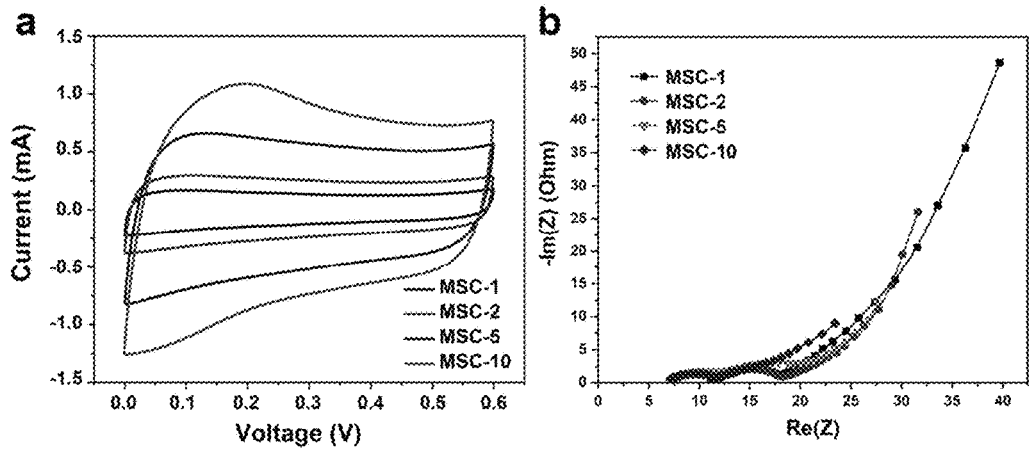
FIGS. 10A-10B show electrochemical performance of fabricated MSCs.
Figures 11A, 11B, 11C, 11D, 11E, 11F:
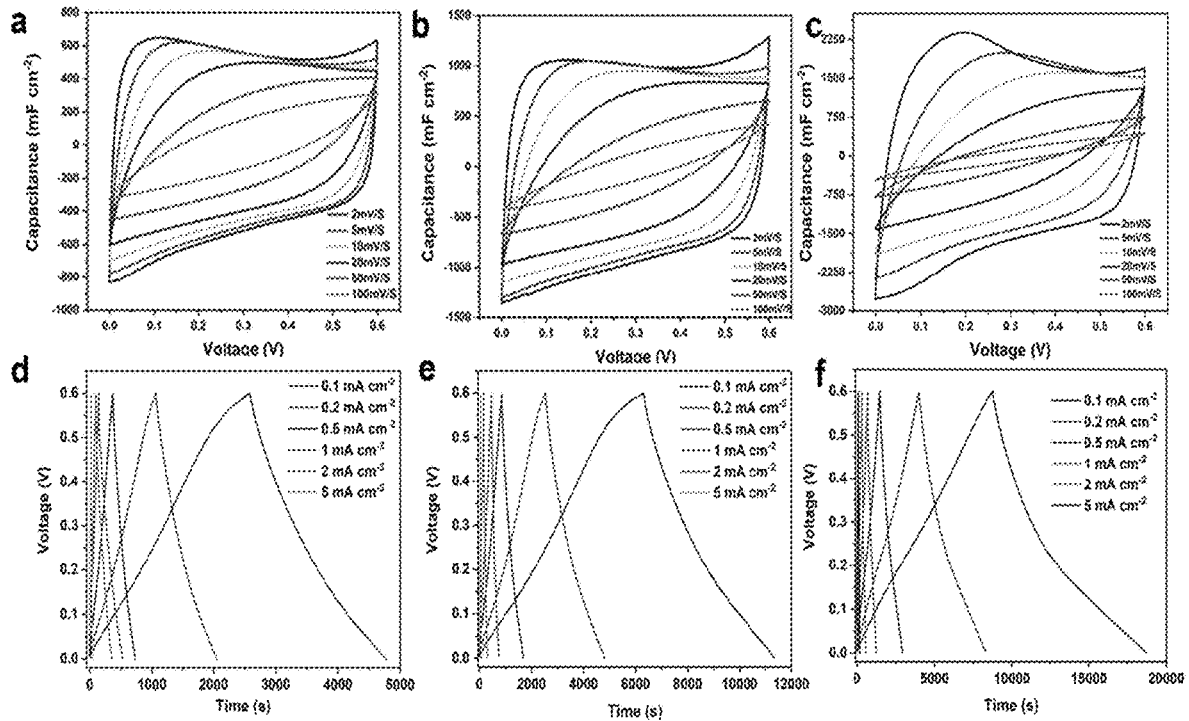
FIGS. 11A-11F show electrochemical test results (CV and GCD) for 3D printed interdigital devices on the glass substrate.

To perform electrochemical characterization on fabricated devices, a gel electrolyte based on polyvinyl alcohol (PVA)/H$_2$SO$_4$ was prepared and carefully drop cast onto the interdigital electrodes of printed devices. FIG. 9A shows the normalized cyclic voltammetry (CV) curves of MSC-1 device at different scan rates. The capacitive charge storage behavior of the device can be inferred from the quasi-rectangular shape of the CV curves and the rapid current response upon voltage reversal. As shown in FIG. 9B, similar CV shapes were observed for MSC-2, MSC-5, and MSC-10 devices. FIG. 9C shows galvanostatic charge-discharge (GCD) profiles of MSC-1 device at different current densities and FIG. 9D compares the GCD profiles of various fabricated MSCs at the same current density of 0.5 mA cm$^{-2}$. These figures show the near-linear change in the potential during both charge and discharge half-cycles for all the tested devices, confirming the capacitive performance observed by CV tests. The CV, GCD, and electrochemical impedance spectroscopy (EIS) results for all the fabricated devices at various scan rates and current densities are shown in FIGS. 10A-10B and FIGS. 11A-11F. At a scan rate of 2 mV s$^{-1}$ (FIGS. 10A-10B), the MSC-1, MSC-2, MSC-5, and MSC-10 devices show specific capacitances of 168.1, 315.8, 685.4, and 1035 mF cm$^{-2}$, respectively. As shown in Table S1 (ESI†), the calculated areal capacitances, even for the device with only one printed layer (MSC-1), are significantly higher than the previously reported values for MXene-based MSCs, which shows the advantage of the 3D printing for the fabrication of high performance MSCs in limited footprint areas.

For all devices, the specific capacitance decreases with increasing the scan rate, and the rate of decrease is dependent on the number of printed layers. To better understand the electrochemical properties of the printed devices, the following equation was followed to fit the specific capacitance data to.

$$C/A = C_A\left[1 - \frac{\upsilon\tau}{\Delta V}\left(1 - e^{\frac{\Delta V}{\upsilon\tau}}\right)\right] \quad (2)$$

where C/A, $C_A$, $\upsilon$, $\tau$, and $\Delta V$ are calculated areal specific capacitance, ideal areal specific capacitance, scan rate, time constant, and voltage window (0.6 V in this experiment), respectively.

Although this equation is a simplification of the complex electrochemical response of the electrodes, it is useful for understanding the electrochemical behavior of the fabricated devices. The changes in calculated C/A with increasing the scan rate were fit to Equation 2, and $C_A$ and $\tau$ were calculated (dash lines in FIG. 9E). $C_A$ versus electrode weight shows the specific capacitance almost linearly increases with increasing the mass loading of the electrodes for the printed MSCs (FIG. 9E inset). Also, the rate capability of the MSCs decreases with increasing the electrode height (number of printed layers). The series resistance of the devices, and the resulting $\tau$, significantly increase as the height of the electrodes increases ($\tau_{MSC-1}$=5.5 s, and $\tau_{MSC-10}$=24.3 s). An increase in $\tau$ result in a sluggish charge/discharge process and limits the capacitive performance and rate capability of the device, particularly at high rates. This is because the horizontal MXene flake alignment results in low out-of-plane electrical conductivity and the dependence of resistance on the electrode height (FIG. 9F). These results indicate that for the devices with thicker electrodes, the electrical properties of the electrodes limits their electrochemical performance, particularly at higher charging/discharging rates. For example, the specific capacitance of the MSC-10 drops from ~695 mF cm$^{-2}$ at 10 mV s$^{-1}$ to ~20 mF cm$^{-2}$ at 1000 mV s$^{-1}$. The performance of these devices can be improved further by engineering the electrode structures and ink properties to increase their out-of-plane conductivity. The rate performance of the fabricated devices is also dependent on their ion transport properties and the ion transport properties of MSCs can be improved by reducing the ionic diffusion path between the electrodes. Therefore, regardless of the height of the electrodes, the rate capability and power density of the 3D printed MSCs can be improved by reducing the gap distance between the interdigital electrodes in modified device architectures.

Substrates

Figures 12A, 12B, 12C, 12D, 12E, 12F, 12G:
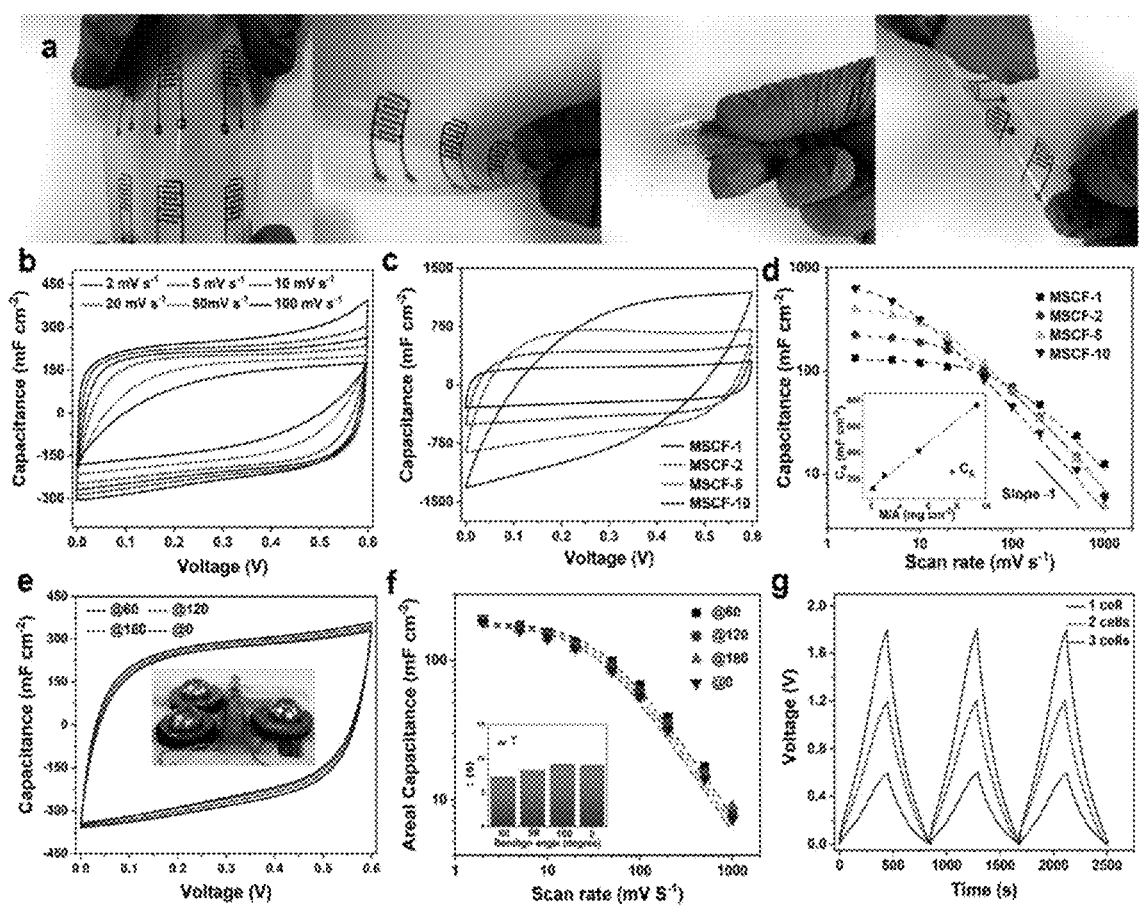
FIGS. 12A-12G show electrochemical performance all-MXene MSCs printed on polymer substrates.
Figures 13A, 13B, 13C, 13D, 13E, 13F, 13G:
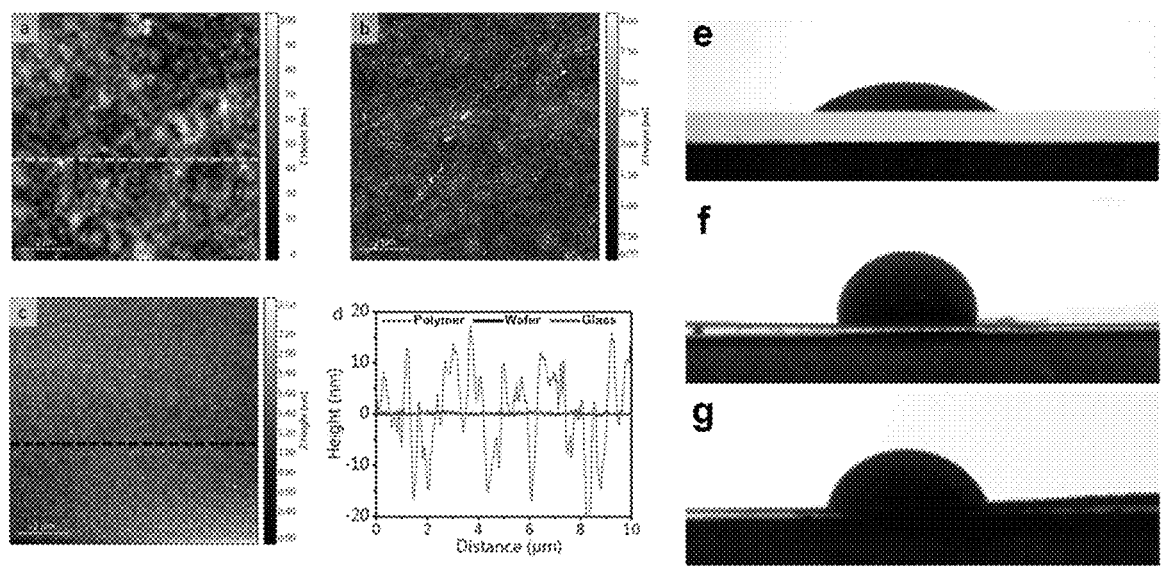
FIGS. 13A-13C show AFM images of polymer, Si/SiO$_2$ wafer, and glass substrate used for printing, respectively.
FIG. 13D shows the height profile of different substrates showing different roughness.
FIGS. 13E-13G show MXene ink contact angle with glass, polymer, and paper substrates, respectively. Differences in surface properties of substrates resulted in wider printed layers on glass and Si/SiO$_2$ wafer substrates.

One advantage of room temperature printing using a water-based MXene ink is that it allows the fabrication of devices on a variety of substrates. 3D printing of MSCs on polymer substrates (flexible polyester films), which enables their application in flexible electronics is also demonstrated. MSCs printed on polymer substrates were subjected to bending and twisting at different angles and directions but showed no sign of crack or detachment from the substrate after the tests (FIG. 12A). The printed flexible devices were labeled as MSCF-n, where n denotes the number of printed electrode layers, and their electrochemical performance was evaluated. FIG. 12B shows the CV curves of the MSCF-1 at different scan rates and FIG. 12C compares the CV curves of MSCF-1, MSCF-2, MSCF-5, and MSCF-10 at 5 mV s$^{-1}$ scan rate. Fitting the calculated specific areal capacitances at various scan rates to Equation 2 showed the increased areal capacitance of the devices with increasing the height of the electrodes (FIG. 12D inset). However, the effect of electrode height on the rate capability and time constant of the devices was more pronounced compared to the devices printed on glass substrates.

For example, the calculated $\tau$ for the MSCF-10 was 50.2 s, which is almost twice the calculated $\tau$ for the MSC-10 (24.3 s). This effect may be attributed to the substrate wetting and roughness properties affecting the final shape and size of the printed electrodes. Although the dimensions of the designed interdigital electrodes and the size of the nozzle used for printing the MSCs on glass and polymer substrates were similar, the lower contact angle of the MXene ink on the glass substrate (FIG. 13A-13G) produced wider printed electrode patterns compared to those printed on polymer substrates (FIGS. 5A-5F and 6A-6F). Therefore, for the devices printed on glass substrate the contact between the electrodes and current collectors was more intimate, than and the gaps between the electrodes were narrower; both contributed to the higher device rate capability. This observation shows that the surface properties of the substrate can play a role in the properties of printing MSCs and should be further studied.

Figures 14A, 14B:
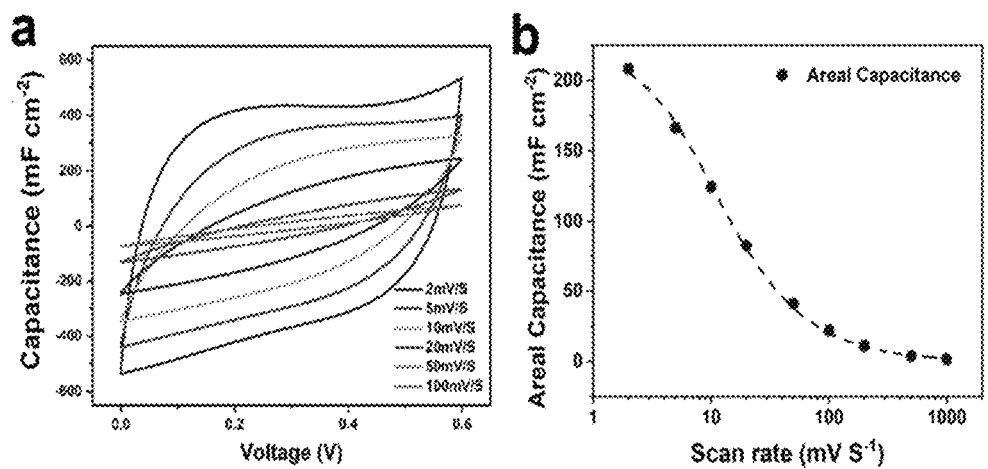
FIGS. 14A-14B show electrochemical results for 3D printed interdigital device on paper substrate.

To test the flexibility of the MSCF devices, the effect of bending on their electrochemical performance was investigated. CV curves at 10 mV s$^{-1}$ and rate capabilities of MSCFs at different bending angles are presented in FIGS. 4e and f, respectively. The flexibility of the printed devices is demonstrated by the specific capacitance, rate capability, and the time constant of the MSCF not changing significantly with changing the bending angle. The adaptability of the printing process for fabrication of MSCs on various substrates was further demonstrated by fabricating devices on paper using the MXene ink to print all the current collectors and electrodes. The printed devices showed very good adhesion to the paper substrate even after bending and twisting. The analysis of the electrochemical performance of MSCs printed on the paper substrate is presented in the supporting information (FIG. 14A-14B).

To achieve higher power and energy densities, several MSCs connected in series or parallel can be printed on the same substrate. FIG. 12G compares the GCD profile of a single MSC-1 device with those of two and three devices connected in series. The operating voltage window was observed to increase for the devices connected in series.

MSC Performance

Figures 15A, 15B:
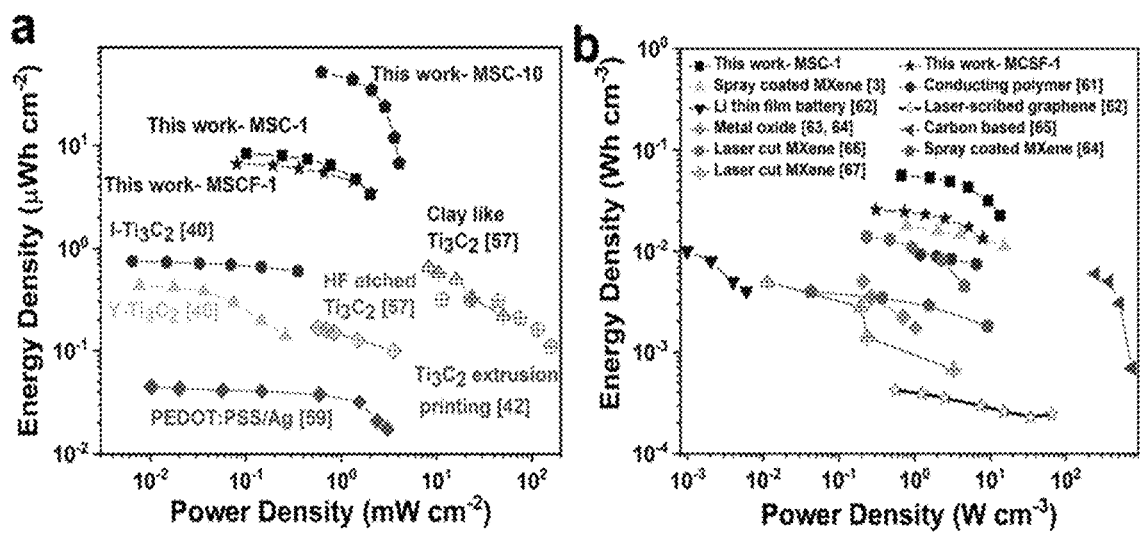
FIGS. 15A-15B show ragone plots showing areal (FIG. 15A) and volumetric energy and power densities (FIG. 15B) of fabricated devices compared to previously reported data.

The areal and volumetric energy and power densities of 3D printed MSCs were calculated and compared to some of the other reported devices in Ragone plots shown in FIG. 15A-15B. The devices with one layer of printed interdigital electrodes (MSC-1 and MSCF-1) both show very high energy and power densities. For MSC-1, the calculated areal energy and power densities are 8.4 $\mu$Wh cm$^{-2}$ and 3.7 mW cm$^{-2}$, respectively, while volumetric energy and power densities are about 56 mWh cm$^{-3}$ and 24.9 W cm$^{-3}$, respectively. As shown in the Ragone plots, these values are significantly higher than those reported for other MXene-based MSCs. MSC-1 also shows significantly improved volumetric energy density compared to some of the best performing and previously reported MSCs based on other materials. The highest measured areal energy and power densities for MSC-10 device were 51.7 $\mu$Wh cm$^{-2}$ and 5.7 mW cm$^{-2}$, respectively. As explained above, MSC-10 has a higher time constant compared to MSC-1, thus its power density rapidly declined with increasing the scan rate (FIG. 15A).

Example 5

Battery Ink Preparation

Figures 16A, 16B, 16C, 16D, 16E, 16F, 16G, 16H, 16I:
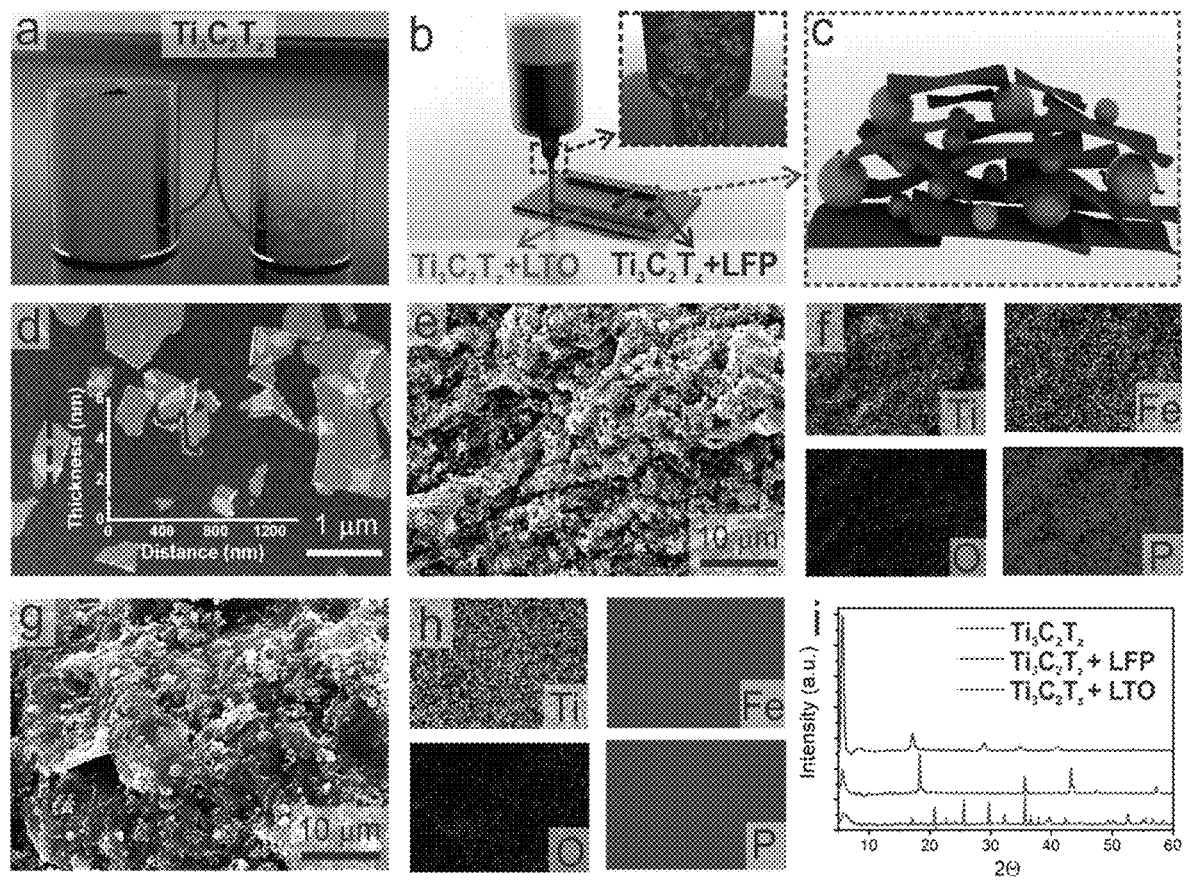
FIGS. 16A-16I show Mxene-based inks preparation and characterization.

The printable MXene ink was fabricated to be substantially free of additives and without high-temperature drying utilizing the exemplary MXene synthesis and ink preparation method described herein. FIGS. 16A-16C show the ink development and fabrication process used. Briefly, $Ti_3C_2T_z$ dispersion was prepared by selectively removing the Al atoms layer from the parent MAX phase, $Ti_3AlC_2$, in HCl and LiF aqueous mixture for 24 h. The mixture was then washed with DI water for several times (pH>5). The supernatant contained 2D MXene flakes with an average size of 0.8 $\mu$m was collected and used to prepare the MXene-based inks (see FIG. 16D). Superabsorbent polymer (SAP) beads were used to remove water from the dispersion to achieve the desired concentrations. The prepared MXene ink was mixed with LFP and LTO nanoparticles to prepare the cathode and anode inks.

3D Printing

The 3D printing of MXene-based inks was performed using a benchtop robotic dispenser (Fisnar F4200n). AutoCad (Autodesk Inc) software was used to design different patterns. Desired patterns were transferred to the robotic dispenser and printed using control software. A pneumatic fluid dispenser was used to adjust the pressure (DSP501N, Fisnar). To increase the load of active material per area, MXene-based inks were deposited in a layer-by-layer fashion on the finger part of the interdigital electrodes. Precise deposition of MXene-based inks is important as the cell structure (architecture, line gap distancing, and electrode width) can considerably affect the ionic transport and, in turn, the electrochemical properties such as the power density and energy density of the fabricated device. Evaluating the printability of the ink and the parameters that affect it may help in designing more efficient architectures. In addition to rheological properties, parameters such as printing pressure (P), printing speed (SN), and the distance between the nozzle tip and the substrate (H) may significantly affect the printing outcome and resolution.

Figures 17A, 17B:
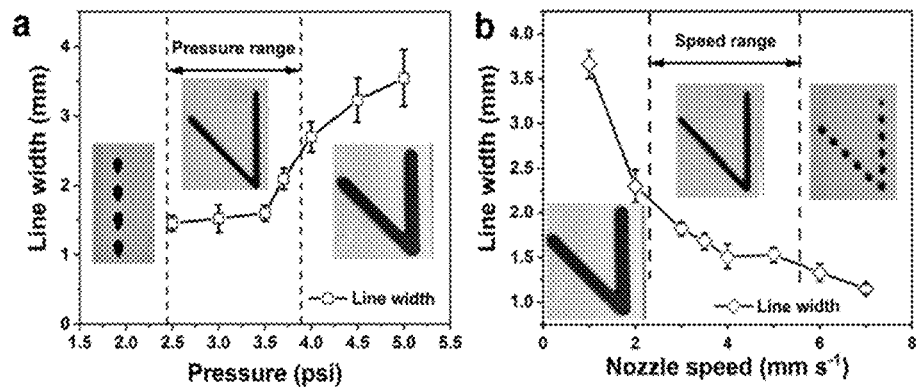
FIGS. 17A-17D show the effect of printing parameters on MXene-based inks printability.

The applied pressure, P, controls ink flow through the nozzle and may affect the printed line width (see FIG. 17A). The viscosity of the ink determines the threshold P ($P_0$) required for printing. Higher P values than $P_0$ will result in higher ink volume extruded throughout the nozzle. Very high P would result in unstable extrusions, like jetting, resulting in difficulty controlling the extruded ink and low-quality prints. Increasing the pressure in a range of acceptable pressures can result in increasing the printing speed. The printed lines are often wider than the nozzle diameter due to the substrate properties and the ink expansion after extrusion.

To evaluate effect of P on printed line width, W, lines were printed at constant SN, H, and nozzle size. FIGS. 17A-17D demonstrate that increasing P would result in printing wider lines as higher ink volume is extruded through the nozzle. At low P, the extruded volume is not enough to form a continuous filament, while at high P significant increase in line width is observed (inset images in FIG. 17A). For the pure MXene ink and the MXene composite inks used, the P range was selected as 2.5-5 psi and 16-25 psi, respectively. The effect of SN on W was further studied, as shown in FIG. 17B. W decreases as SN increases while other variables are kept constant (P=3.5 psi, nozzle diameter=gage 25). Increasing the nozzle speed can lead to printing narrower lines until the lines become discontinued. Alternatively, P and SN can be adjusted separately.

Figures 18A, 18B:
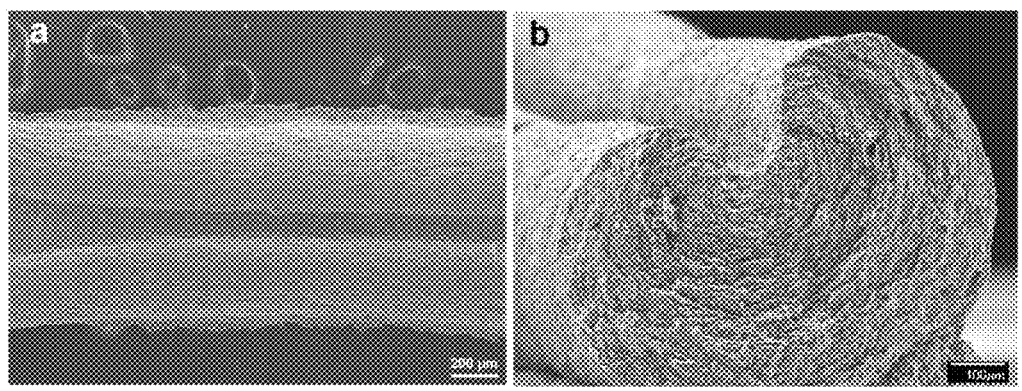
FIGS. 18A-18B show SEM images of printed MXene+ LFP ink showing the effect of small H.
Figures 19A, 19B, 19C:
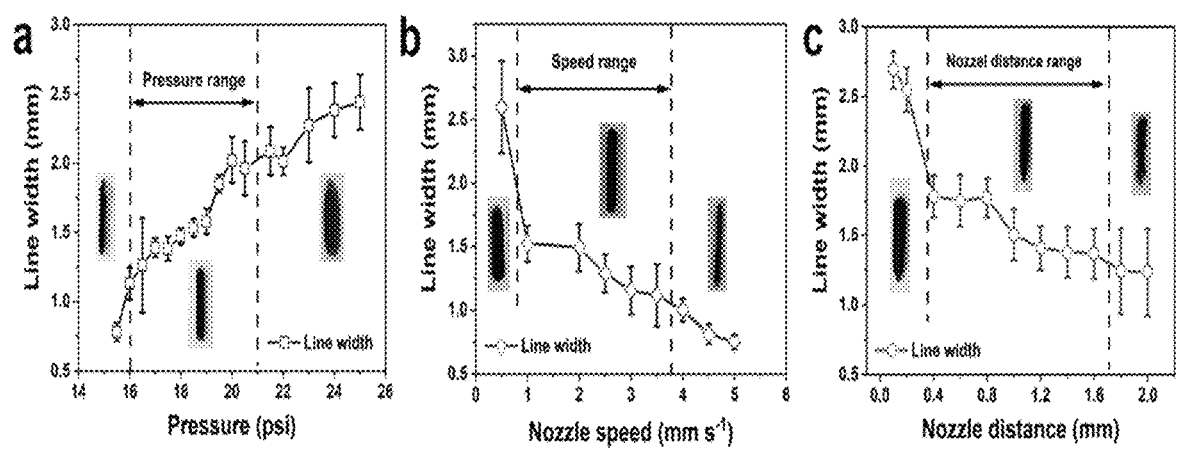
FIGS. 19A-19C show the effect of printing parameters on the line width.

The distance between the nozzle tip and the substrate (H) is another factor affecting the printing outcome. In addition to W, line length is important as it takes time for the ink to have contact with the substrate, resulting in a shorter line than designed. The ink accumulation on the nozzle tip causes over deposition at the beginning of the print, indicating the nozzle tip should be closer to the substrate. Small H would result in a U shape cross-section (see FIGS. 18A-18B). Similar test procedures were applied to MXene+LFP ink to evaluate the effect of various parameters on printing outcome (see FIGS. 19A-19C). The results showed similar behavior for both inks.

Example 6

Material Characterization

The structure and morphology of the synthesized MAX powders, printed electrodes, and devices were studied using a scanning electron microscope (JEOL JSM-7000F) equipped with an energy dispersive spectrometer (EDS detector). Electrical conductive was conducted by using four-point probe method to measure the 3D printed electrodes. AFM (Park Systems, NX10) was used to measure the size and thickness of the synthesized $Ti_3C_2T_z$ flakes. To prepare the AFM samples, a small amount of the solution was diluted with DI water and drop-casted on the pieces of thermally oxidized silicon wafers.

The scanning electron microscopy (SEM) and energy dispersive analysis (EDS) in FIGS. 16C-16F show that the MXene flakes and nanoparticles were uniformly mixed. Besides, the X-ray diffraction (XRD) data showed the MXene characteristic peak and a perfect fit with the standard orthorhombic LFP (JCPDS #40-1499) and cubic spinel LTO (JCPDS #49-0207), suggesting the mixture did not affect the crystal structure of nanoparticles (FIG. 16I).

Rheology

Rheological properties of the prepared MXene inks were studied using a strain-controlled rotational rheometer (Physica MCR301, Anton Paar). Fixture geometries (made of stainless steel) used for testing were parallel-plates (25 mm diameter) and cone and plate (25 mm diameter, cone angle=0.03 rad) to ensure there are no artifacts in the data due to testing geometry. After loading the rheometer with MXene ink at 25° C., multiple times up to 2 hours were selected to allow the sample to equilibrate and eliminate viscoelastic history before the investigation of rheological properties. A time of 20 minutes was chosen since no significant change was observed in elastic and storage moduli at a strain amplitude of 0.01 and steady shear viscosity data. All experiments were performed with a silicone oil coating along the edges of the fixtures and a solvent trap of deionized water to prevent water loss due to extended testing. A preliminary shear protocol was established at a shear rate of 0.01 s$^{-1}$ to prevent structure change before measuring oscillatory dynamics.

Figures 20A, 20B:
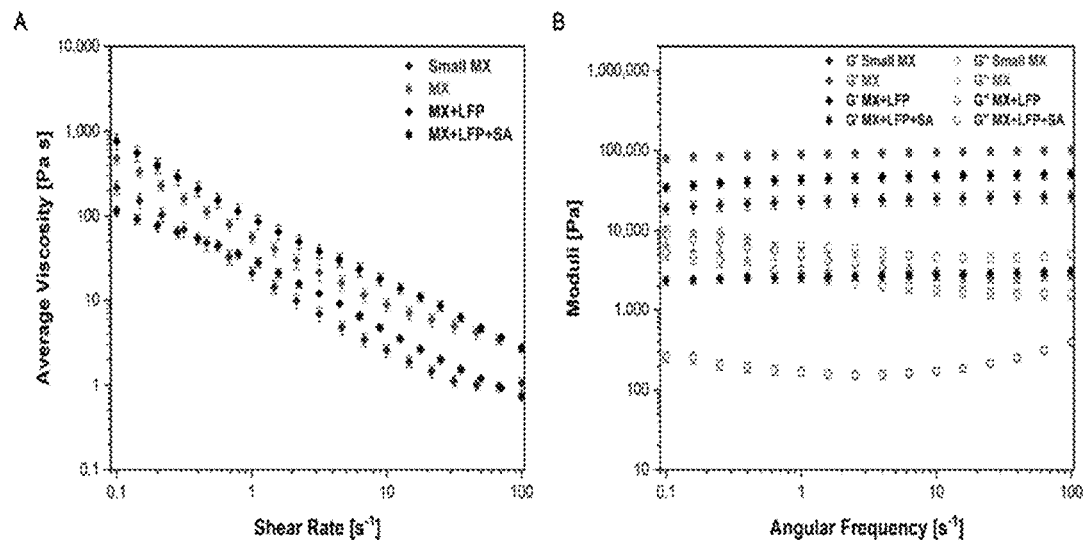
FIGS. 20A-20B show rheology studies performed on MX, MX+LFP, and MX+LFP+SA compared with small MX.
Figures 21A, 21B, 21C, 21D, 21E, 21F:
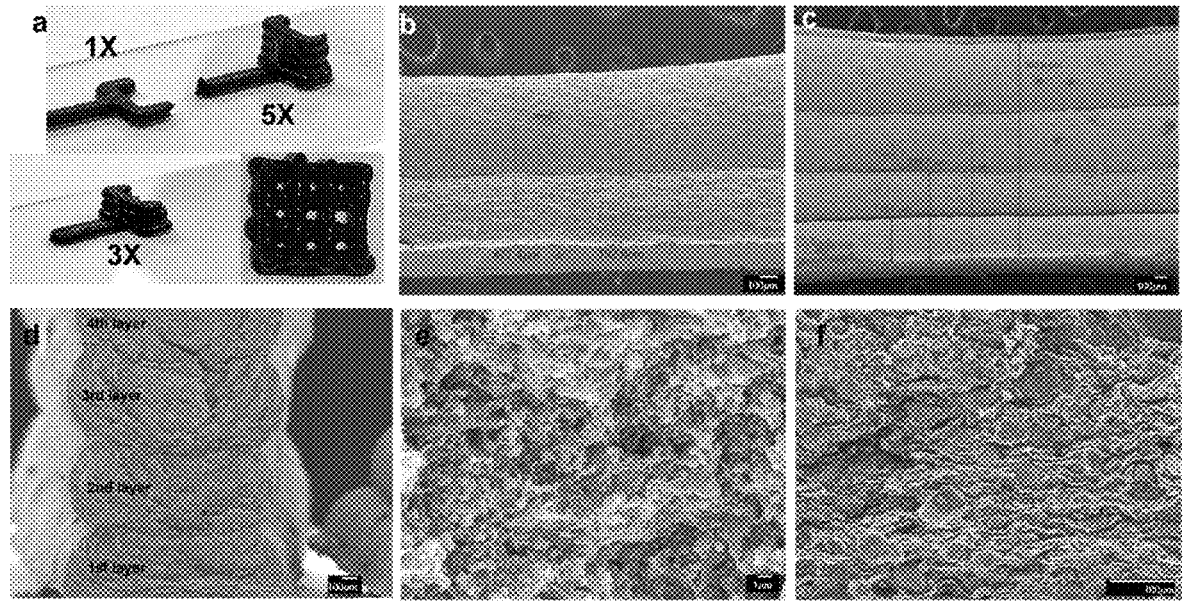
FIGS. 21A-21F show optical and SEM images of printed lines and architectures using MX+LFP ink.

The effect of MXene sheet size, content, and nanoparticle addition on viscoelastic properties for 3D printable ink was evaluated. The materials utilized in this study were ~0.8 μm long and 1.6 nm thickness 2D MXene sheets (aspect ratio L/D=500), 200 nm spherical lithium iron phosphate (LFP), and sodium alginate (SA). Rheology was performed on MXene (MX) alone as well as multi-components MX+LFP and MX+LFP+SA to study the effects of size and shape on the final properties. Data from MXene with small sheet sizes with dimensions of ~0.3 μm long and 1.6 nm thickness (aspect ratio L/D=187) was also evaluated. FIGS. 20A-20B show an overlay of the rheology data. The steady shear viscosity curves in FIG. 20A demonstrate shear-thinning behavior for all the dispersions, where higher viscosities were observed for the dispersions with large MX sheets. In the lower shear rate region for MX+LFP+SA, the SA behavior dominates and represents what may be considered a transition region, which has also been previously observed with other multi-component dispersions composed of SA. FIG. 20B shows the oscillatory behavior for the materials, where the moduli G' (storage modulus) and G" (loss modulus). For all of the dispersions, G' is relatively constant and G'>>G" across the entire frequency range is observed. This observation suggests interlayer adhesion for successful printing of multiple 3D layers. However, the dispersion with SA illustrates an order of magnitude lower moduli than the other dispersions, which has been found to lack structural integrity when printing and decreases electrochemical performance. These results provide insight into the fundamental interactions at the nanoscale for further fabricating MXene-based lithium-ion battery electrodes, which serve as conductive alternatives to carbon-based materials that typically require additives for achieving enhanced electrochemical performance.

Example 7

Battery Fabrication

Figures 17C, 17D:
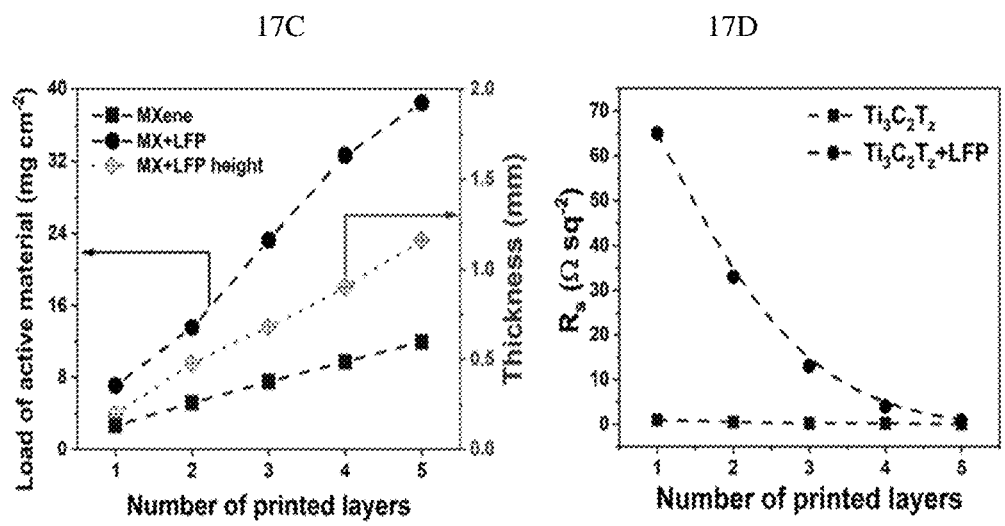

The MXene-based composite inks were loaded in different syringes and used to print different shapes and geometries, including LIB s with interdigital architecture by a robotic dispenser. The $Ti_3C_2T_z$-based composite inks' viscoelastic properties resulted in a mechanically robust print. Multiple layers were printed in a layer-by-layer-fashion to achieve a high load of active material per area without collapse (FIGS. 21A-21F). To understand the relationship between the number of printed layers with line thickness, the load of active materials per area, and electron transfer properties of electrodes with 1-5 layers were evaluated (printed in a layer-by-layer fashion without drying time). The printed lines were functioning as current collectors and active material. FIG. 17C shows the relationship between the number of printed layers and line thickness and materials load. The results suggest a linear relationship between the thickness and load of material per area with the number of printed layers contributing to the good viscoelastic properties of the MXene-based inks. The first printed filament showed exceptional shape retention upon subsequent printing layers on top of it and did not show buckling (FIGS. 21A-21F). The shear forces induced in the nozzle lead to the MXene flakes' alignment in the extrusion direction (FIGS. 21A-21F). Printed MXene and MXene-LFP electrodes exhibit low sheet resistance values (FIG. 17D). By increasing the electrodes' thickness, controlled by the number of the printed layers, the sheet resistance decreases.

Electrochemical Measurements

The fabricated LIB s electrochemical performances were tested using a LAND-CT and VMP3 potentiostat (Biologic, France). The galvanostatic charge-discharge tests were conducted in a voltage range of 3.8 V to 2.5 V versus Li/Li$^+$ for the cathode (MXene+LFP), and 2.5 V to 1 V versus Li/Li$^+$ for the anode (MXene+LTO). Lithium was used as the counter and reference electrode. The liquid electrolyte was 1 M LiPF6 in EC/DEC (1:1 by volume). The full cells were tested in a voltage range of 2.5 V to 1 V. All the cells were assembled in a high-purity argon-filled glovebox. The electrochemical properties of printed $Ti_3C_2T_z$-LFP and $Ti_3C_2T_z$-LTO half cells and full cells are presented in FIG. 22A-22F. The electrochemical tests were performed in a house-made cell (FIG. 23A-23C). The tested electrodes were connected to the electrochemical test station by applying a silver paste to the electrode tails, and 1M LiPF6 ethylene carbonate and diethyl carbonate was used as the electrolyte. The electrodes were dried at room temperature overnight, followed by drying for 48 hours at 120° C. to remove the remaining water in the structure. Lithium metal was used as the counter and reference electrode in half cells. The cells were rested for 24 hours before running the tests.

Figures 22A, 22B, 22C, 22D, 22E, 22F:
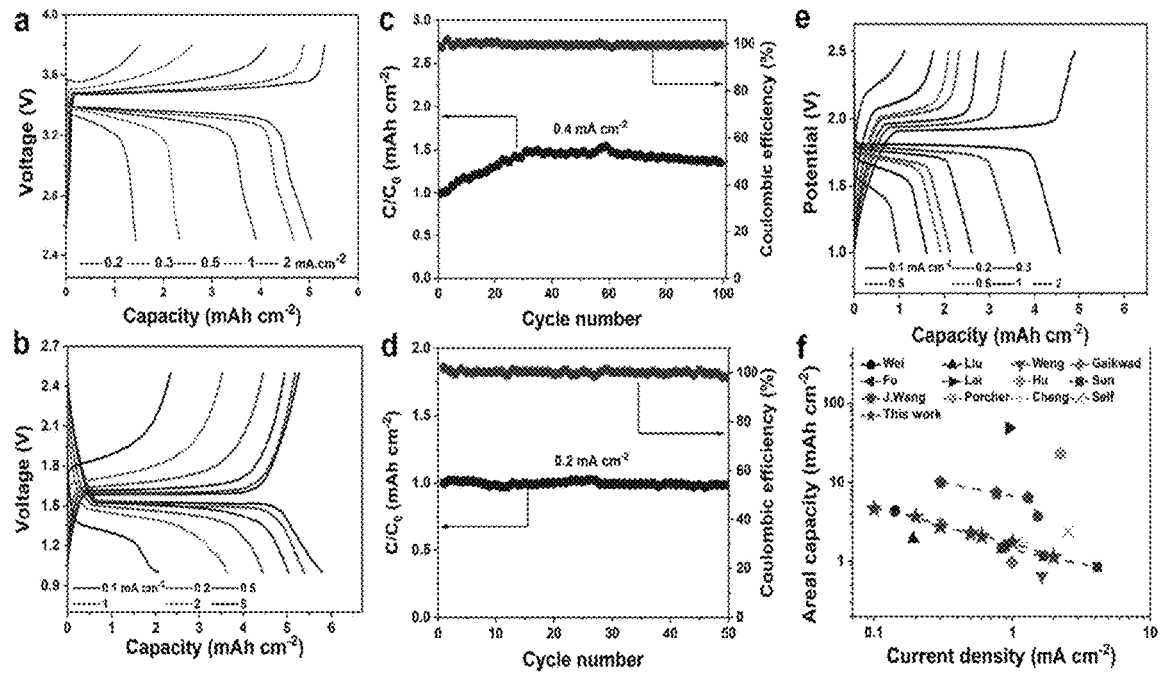
FIGS. 22A-22F show the electrochemical performance of 3D printed MXene-based electrodes.
Figures 23A, 23B, 23C:
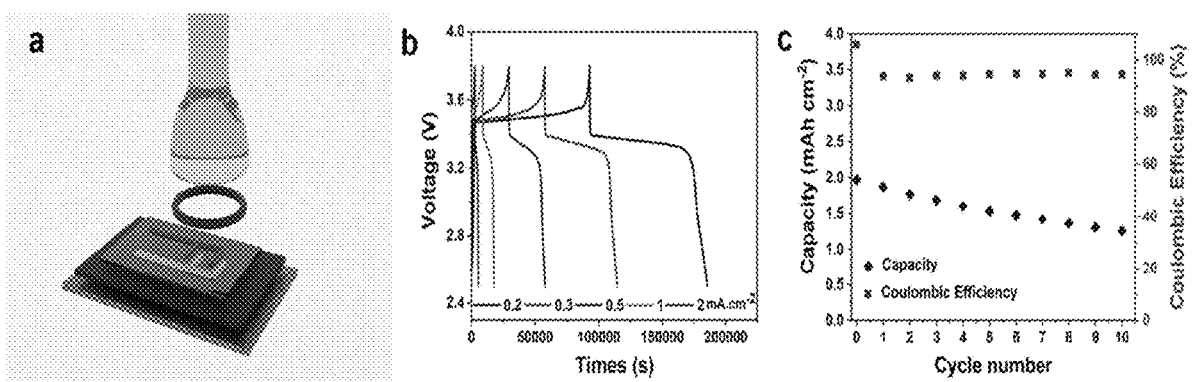
FIGS. 23A-23C show the electrochemical performance of 3D printed full cell.

FIGS. 22A and 22B shows the charge and discharge curve of $Ti_3C_2T_z$-LFP and $Ti_3C_2T_z$-LTO electrodes at different current densities, respectively. The voltage hysteresis between the charge and discharge plateaus are ~0.1 V, similar to reported values for graphene oxide composite inks with LFP and LTO. The voltage hysteresis stayed stable over cycling for $Ti_3C_2T_z$-LFP and $Ti_3C_2T_z$-LTO electrodes, indicating good electrical conductivity. The $Ti_3C_2T_z$-LFP electrode showed the areal specific capacities of 5.05, 4.7, 3.9, 2.4, and 1.5 mAh cm-2 at specific current densities of 0.2, 0.3, 0.5, 1, and 2 mA cm-2, respectively. Slightly higher capacities at charge were reported previously and could be related to increased length of the diffusion path and hosting of Li+ ions in the MXene matrix, which increases the ionic diffusion resistivity. The $Ti_3C_2T_z$-LTO electrode showed areal capacities of 5.8, 5.4, 5.0, 4.5, 3.6, and 2.1 mAh cm-2 at specific current densities of 0.1, 0.2, 0.5, 1, 2, and 5 mA cm-2, respectively. The $Ti_3C_2T_z$-LTO half cells showed a plateau at ~1.55 V with stable performance over cycling (FIG. 22C). The MXene-based electrodes showed good cycling stability, as presented in FIGS. 22C and 22D. The increase in capacity over cycling can be related to improved ionic accessibility and activation of the electrode over cycling (FIG. 22C). Both $Ti_3C_2T_z$-LFP and $Ti_3C_2T_z$-LTO half cells showed Coulombic efficiency of ~100% (FIGS. 22C and 22D right axes).

FIG. 22E shows the electrochemical performance of a $Ti_3C_2T_z$-LFP cathode and $Ti_3C_2T_z$-LTO anode full cell at different scan rates. The $Ti_3C_2T_z$-LFP II $Ti_3C_2T_z$-LTO full cells showed the areal specific capacities of 4.7, 3.7, 2.7, 2.25, 2, 1.7, and 1.1 mAh cm-2 at specific current densities of 0.1, 0.2, 0.3, 0.5, 0.6, 1, and 2 mA cm-2, respectively. The excellent electrochemical performance of fabricated devices may be attributed to the electrodes' porous structure, reduced agglomeration of both phases, and the 3D structure of the cell. The 3D printed full cells showed good cycling stability and Coulombic efficiency close to 100% (FIGS. 23A-23C). FIG. 22F compares the 3D printed MXene-based LIB s electrochemical performance compared with some of the best reported values in the literature. Optimization of the ink formulation and cell geometry may further improve the capacity and rate capability of the 3D-printed cells to utilize their full potential.

What is claimed is:

1. A conductive material comprising:
   a battery composition,
   an additive, and
   a solvent,
   wherein the additive is a highly concentrated 2D MXene composition comprising flakes, wherein the conductive material is substantially free of an organic solvent, and wherein a concentration of the flakes in the solvent is between about 250 mg/ml to about 350 mg/ml.

2. The conductive material of claim 1, wherein the MXene composition has a general formula of $M_{n+1}X_n\, T_x$ (n–1, 2, or 3), where M denotes a transition metal, X is carbon and/or nitrogen and $T_x$ denotes a surface functional group.

3. The conductive material of claim 1, wherein the MXene composition is $Ti_3C_2T_x$ and $T_x$ denotes a surface functional group.

4. The conductive material of claim 1, wherein the additive is a conductive composition.

5. The conductive material of claim 1, wherein the battery composition is an anode material or a cathode material.

6. The conductive material of claim 5, wherein the anode material or cathode material is for Li-ion, Na-ion, Mg-ion, Al-ion, Ca-ion, Zn-ion, and any combination thereof.

7. The conductive material of claim 5, wherein the battery composition is selected from the group consisting of lithium iron phosphate, lithium titanate, lithium cobalt oxide, lithium iron phosphate, lithium manganese oxide, lithium nickel cobalt aluminum oxide, lithium nickel manganese cobalt oxide, graphite, sulfur, silicon, and any combination thereof.

* * * * *